(12) United States Patent
Negahdar et al.

(10) Patent No.: US 9,076,201 B1
(45) Date of Patent: Jul. 7, 2015

(54) VOLUMETRIC DEFORMABLE REGISTRATION METHOD FOR THORACIC 4-D COMPUTED TOMOGRAPHY IMAGES AND METHOD OF DETERMINING REGIONAL LUNG FUNCTION

(71) Applicant: University of Louisville Research Foundation, Inc., Louisville, KY (US)

(72) Inventors: Mohammadrreza Negahdar, Louisville, KY (US); Amir A. Amini, Louisville, KY (US); Neal Dunlap, Louisville, KY (US); Shiao Woo, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 44 days.

(21) Appl. No.: 13/854,729

(22) Filed: Apr. 1, 2013

Related U.S. Application Data

(60) Provisional application No. 61/618,081, filed on Mar. 30, 2012.

(51) Int. Cl.
*G06T 7/00* (2006.01)
(52) U.S. Cl.
CPC ............. *G06T 7/0024* (2013.01); *G06T 7/0012* (2013.01); *G06T 2207/10076* (2013.01); *G06T 2207/10081* (2013.01); *G06T 2207/30061* (2013.01)
(58) Field of Classification Search
CPC ............... G06T 7/0012; G06T 7/0024; G06T 2207/10076; G06T 2207/10081; G06T 2207/30061
See application file for complete search history.

(56) References Cited

U.S. PATENT DOCUMENTS 8,059,915 B2 * 11/2011 Sharon et al. ................. 382/286

OTHER PUBLICATIONS

Negahdar et al., "Regional Lung Strains via a Volumetric Mass Conserving Optical Flow Mode", May 2012, Biomedical Imaging (ISBI), 2012 9th IEEE International Symposium on, 1475-1478.*
Negahdar et al., "A 3D optical flow technique based on mass conservation for deformable motion estimation from 4-D CT images of the lung", Mar. 23, 2012, SPIE Medical Imaging, 83171F-83171F-6.*

(Continued)

*Primary Examiner* — Katrina Fujita
(74) *Attorney, Agent, or Firm* — Stites & Harbison PLLC; Jeffrey A. Haeberlin; Terry L. Wright

(57) ABSTRACT

A method of deformable image registration for thoracic 4-D computed tomography (CT) images includes: receiving, by a processing device, a set of thoracic 4-D CT images; and iteratively solving, by the processing device, an energy function applied to subsequent images of the set of thoracic 4-D CT images to transform the subsequent images into respective optical flow fields between the subsequent images, the energy function enforcing the following constraints on the subsequent images: intensity constancy; mass conservation; gradient constancy; and spatio-temporal smoothness. A method of determining regional lung function includes: receiving, by a processing device, a set of thoracic 4-D CT images of a lung; transforming, by the processing device, the set of 4-D CT images of the lung into respective spatial voxel-wise deformation maps; and transforming, by the processing device, the spatial voxel-wise deformation maps into respective spatial voxel-wise strain maps of the lung indicating regional mechanics of the lung.

14 Claims, 12 Drawing Sheets

(56) References Cited

OTHER PUBLICATIONS

Murkherjee et al., "Myocardial Motion Computation in 4D Ultrasound", 2011, Biomedical Imaging: From Nano to Macro, 2011 IEEE International Symposium on, 1070-1073.*

Yin et al., "Local tissue-weight-based nonrigid registration of lung images with application to regional ventilation", 2009, Medical Imaging 2009: Biomedical Applications in Molecular, Structural, and Functional Imaging, 72620C-1-72620C-10.*

Negahdar et al., "Planar deformable motion estimation incorporating mass conservation and image gradient constancy", Biomedical Imaging: From Nano to Macro, 2011 IEEE International Symposium on, 536-540.*

Negahdar et al., "An automated landmark-based elastic registration technique for large deformation recovery from 4-D CT lung images". SPIE Medical Imaging, 83171G-83171G-6.*

Negahdar et al., "Strain as a novel index of regional pulmonary function from thoracic 4-D CT images: in-vivo validation with tomographic SPECT ventilation and perfusion", Mar. 29, 2013, SPIE Medical Imaging, 867213-867213-7.*

Negahdar et al., "Multi-scale optical flow including normalized mutual information for planar deformable lung motion estimation from 4D CT", Engineering in Medicine and Biology Society, EMBC, 2011 Annual International Conference of the IEEE, 4888-4892.*

Bereziat et al., "A Generalized Optical Flow Constraint and its Physical Interpretation", 2000, Computer Vision and Pattern Recognition, 2000. Proceedings. IEEE Conference on, vol. 2, 487-492.*

Ehrhardt et al., "An optical flow based method for improved reconstruction of 4D CT data sets acquired during free breathing", 2007, Medical Physics 34, 711-721.*

Wildes et al., "Recovering Estimates of Fluid Flow from Image Sequence Data", 2000, Computer Vision and Image Understanding 80, 246-266.*

Yang et al., "4D-CT motion estimation using deformable image registration and 5D respiratory motion modeling", 2008, Medical Physics 35, 4577-4590.*

\* cited by examiner

VOLUMETRIC DEFORMABLE REGISTRATION METHOD FOR THORACIC 4-D COMPUTED TOMOGRAPHY IMAGES AND METHOD OF DETERMINING REGIONAL LUNG FUNCTION

RELATED APPLICATIONS

This application claims priority to U.S. Provisional Patent Application No. 61/618,081, filed Mar. 30, 2012, the entire disclosure of which is incorporated herein by reference.

TECHNICAL FIELD

The presently-disclosed subject matter relates to a volumetric deformable registration method for thoracic 4-D computed tomography (CT) images and to a method of determining regional lung function. In particular, the presently-disclosed subject matter relates to a volumetric deformable registration method and a method of determining regional lung function whereby a set of thoracic 4-D CT images of lungs are transformed into optical flow fields and/or deformation maps.

BACKGROUND

Lungs are essential organs for respiration, facilitating gas exchange between the human body and the atmosphere by delivering oxygen from the air into the venous blood and extracting carbon dioxide from the blood at the same air-blood interface. Moreover, lungs play other critical roles in physiology, including rapid modulation of blood pH, thermoregulation, and immunoprotection. Despite the specific function being performed by a lung at any given time, however, from an anatomic standpoint, each lung is attached by its root and pulmonary ligament to the heart and trachea, but is otherwise free in the thoracic cavity. Moreover, with respect to human lungs, human lungs consists of the left and right lungs, with the two lungs being located in the chest on either side of the heart and each having an apex, three surfaces (costal, medial, and diaphragmatic), and three borders (anterior, inferior, and posterior). Each lung is surrounded by a closed pleural cavity formed from a two-layered, membrane structure, namely the outer pleura (parietal pleura) that is attached to the chest wall and the inner pleura (visceral pleura) that covers the lungs and divides the two lungs into five lobes. The left lung has two lobes, the left upper lobe (LUL) and the left lower lobe (LLL), which are separated by an oblique fissure. The right lung, on the other hand, is partitioned into three lobes: the right upper lobe (RUL); the right middle lobe (RML); and the right lower lobe (RLL). The RUL and RML are separated by a horizontal fissure and the RML and RLL are separated by an oblique fissure. Through the separation of the various lung loads by the fissures, the lung lobes are thus allowed to slide against the chest wall and adjacent lobes during respiration, and thereby provide the means to reduce lung parenchymal distortion and avoid regions of high local stress that may otherwise impede lung function.

Typically, lung tissue function depends upon the material properties of the lung parenchyma and the relationships between the lungs, diaphragm, and other parts of the respiratory system. The mechanical properties of lung parenchymal tissue are both elastic and dissipative, as well as being highly nonlinear. Yet, pulmonary diseases and/or injuries can change the tissue material properties of lung parenchyma. For example, pulmonary emphysema, a chronic obstructive pulmonary disease (COPD), is characterized by loss of elasticity (increased compliance) of the lung tissue from destruction of structures supporting the alveoli and destruction of capillaries feeding the alveoli. As another example, idiopathic pulmonary fibrosis (IPF), a classic interstitial lung disease, causes inflammation and fibrosis of tissue in the lungs and, over time, the disease makes the tissue thicker and stiffer (reduced compliance) and subsequently leads to associated mechanical changes within the lung itself.

To date, computed tomography (CT) has been the primary means to efficiently and effectively analyze the changes in lung function associated with pulmonary diseases and injuries. In this regard, CT theory, techniques, and applications have seen continuous development over the years, including advances in X-ray CT, such as transition from fan-beam to cone-beam geometry, from single-row detector to multiple-row detector arrays, and from conventional to spiral CT that permits a larger scanning range in shorter time and with a higher image resolution. More specifically, first generation CT only consisted of a single detector and a sharply collimated X-ray beam, and the attenuation profile was recorded during a translation of both the source and detector, which was followed by a rotation of both the detector and the X-ray tube to generate the projection profile for a different angle. Second generation scanners acquired the data in the same manner, but utilized several detector elements and an X-ray fan beam with less collimation, and a separate translational movement was still part of the acquisition process. In third generation scanners, only a rotation of the curved detector row together with the X-ray tube was carried out. A stationary detector ring with rotating X-ray tube was used in the fourth generation systems, and helical CT was then developed to cover a larger volume of the body in a short time, where the data are acquired as the table position was moved continuously in the scanner. Such a simultaneous motion of the patient bed and rotation of the X-ray source and detectors then resulted in a spiral trajectory of the X-ray transmitted through patient. In all, seven generations of X-ray CT systems have now been developed, with the latest generation being cone-beam CT systems having many detector rows (256 rows are now available) and capable of performing helical scans.

Despite advances in CT imaging, however, respiratory motion often degrades anatomic position reproducibility during imaging. In turn, that degradation then necessitates larger margins to be drawn during certain therapy planning, such as during radiotherapy planning where smaller margins can cause errors during radiation delivery. For instance, radiation therapy is a standard technique for cancer treatment where cancer cells are destroyed by highly energetic ionizing radiation. In particular, in conformal radiation therapy, high-energy radiation beams from several angles are focused precisely onto the tumor and, ideally, these beams overlap exactly in the tumor so that the tumor receives the maximum dose of radiation while the radiation in the surrounding healthy tissue is minimized. Likewise, in intensity-modulated radiation therapy (IMRT) radiation beams are delivered in approximately 300 different segments, focusing the radiation on the tumor and giving radiation therapists the ability to sculpt the edges of a tumor and minimize damage to adjacent healthy tissue. Moreover, in image-guided radiation therapy (IGRT), repeated imaging scans are performed during treatment to identify changes in a tumor's size and location due to treatment and to allow needed adjustments in the position of the patient or the planned radiation doses. In all of these types of radiation therapy, however, large margins around a tumor must typically be drawn as the imaging often prevents precise anatomical mapping of the tumor and healthy tissue.

In this regard, CT scans acquired synchronously with the respiratory signal can be used to reconstruct 4-D CT scans, which can be employed for 4-D treatment planning. This approach explicitly accounts for the respiratory motion and provides an estimate of the intrathoracic tumor motion by acquiring a sequence of 3-D CT image sets over consecutive segments of a breathing cycle. After 4-D CT data acquisition and image reconstruction, a software algorithm can then retrospectively sort the images into multiple temporally coherent volumes.

In most thoracic 4-D CT studies, ten respiratory phases are imaged and these are typically referred to as phases P00, P10, ..., P90, where phase P00 corresponds to end-inhale and phase P50 corresponds to end-exhale. The full set of images provides a movie of the internal anatomical motion resulting from a sampled respiratory cycle and has found some use for tumor targeting in radiotherapy treatment planning. Nevertheless, registration of such large data sets requires a computationally efficient image registration algorithm. Furthermore, the image acquisition process often renders the resulting thoracic CT images prone to noise, blurring, and image artifacts. Moreover, motion reproducibility assumption with respect to the breathing index and insufficient number of projections per breathing phase for volumetric 3-D reconstruction continue to be frequent limitations of 4-D CT.

BRIEF SUMMARY OF THE INVENTION

The present invention provides objective methods to register volumetric deformation for thoracic 4-D computed tomography images, and to determine the regional mechanics which reflect regional pulmonary function.

In one exemplary implementation, a method of deformable image registration for thoracic 4-D computed tomography (CT) images includes: receiving, by a processing device, a set of thoracic 4-D CT images; and iteratively solving, by the processing device, an energy function applied to subsequent images of the set of thoracic 4-D CT images to transform the subsequent images into respective optical flow fields between the subsequent images, the energy function enforcing the following constraints on the subsequent images: intensity constancy; mass conservation; gradient constancy; and spatio-temporal smoothness.

In one implementation, intensity constancy is formulated as:

$$I(X+W)=I(X)$$

where I is the image intensity as a function of space and time, $X:=(x, y, z, t)^T$, and $W:=(u, v, w, 1)^T$ is a displacement vector field between the subsequent images; mass conservation is formulated as:

$$\nabla \cdot (IV)+I_t=0 \Rightarrow \nabla I \cdot (V)+I(\nabla \cdot V)+I_t=0$$

$$I_x u+I_y v+I_z w+Iu_x+Iv_y+Iw_z+I_t=0$$

where $V=(u,v,w)$ is a velocity field; gradient constancy is formulated as:

$$\nabla I(X+W)=\nabla I(X)$$

and spatio-temporal smoothness is formulated as:

$$|\nabla_4 u|^2+|\nabla_4 v|^2+|\nabla_4 w|^2$$

where $\nabla_4:=(\partial_x, \partial_y, \partial_z, \partial_t)^T$ and u, v, and w are components of displacement along x, y, and z; and the energy function is formulated as:

$$E(u, v, w) = \int_{\Omega_t}\int_{\Omega_s} (E_D + \alpha E_S) dv dt$$

$$= \int_{\Omega_t}\int_{\Omega_s} \psi[|I(X+W)-I(X)+\beta(I\nabla \cdot V)|^2 +$$

$$\gamma|\nabla I(X+W)-\nabla I(X)|^2] + \alpha(\psi[|\nabla_4 u|^2+|\nabla_4 v|^2+|\nabla_4 w|^2])dv dt$$

where: $\Omega_s$ is a volume over which motion is to be estimated; $\Omega_t$ is a temporal sequence of volumetric lung images; the function $\psi(s^2)=\sqrt{s^2+\epsilon^2}$ is a modified $L_1$ norm which is convex and yields robustness to outliers in the minimization process; $\epsilon$ is a non-zero number utilized for numerical reasons to avoid dividing by zero; and $\beta$ can only be zero or one: zero when the object is incompressible and one when the object is compressible. In some implementations, the energy function is discretized with all image derivatives approximated by finite differences.

In further implementations, the exemplary method of deformable image registration for thoracic 4-D computed tomography (CT) images further includes the steps of: downsampling the set of thoracic 4-D CT images into a set of downsampled thoracic 4-D CT images prior to computing the optical flow field; computing the respective optical flow fields between the subsequent images of the set of downsampled thoracic 4-D CT images as respective downsampled optical flow fields; upsampling the set of downsampled thoracic 4-D CT images into an upsampled set of thoracic 4-D CT images; and computing the respective optical flow fields between the subsequent images of the set of upsampled thoracic 4-D CT images using the respective downsampled optical flow fields as respective initial transformations.

Further provided by the present invention are methods of determining regional lung function. In one exemplary implementation, a method of determining regional lung function is provided that includes: receiving, by a processing device, a set of thoracic 4-D CT images of a lung; transforming, by the processing device, the set of 4-D CT images of the lung into respective spatial voxel-wise deformation maps; and transforming, by the processing device, the spatial voxel-wise deformation maps into respective spatial voxel-wise strain maps of the lung indicating regional mechanics of the lung.

In one implementation, transforming the set of 4-D CT images into the respective spatial voxel-wise deformation maps includes registering volumetric images of expiratory phases of the lung pairwise to calculate a deformation field between a max-inhale respiratory phase and a max-exhale respiratory phase of the 4-D CT images through composition of pairwise calculated deformations (u, v, w). Transforming the 4-D CT data for the lung into the spatial voxel-wise deformation map of the lung, in some implementations, further includes calculating a deformation gradient tensor (DGT) as:

$$F = \begin{bmatrix} 1+u_x & u_y & u_z \\ v_x & 1+v_y & v_z \\ w_x & w_y & 1+w_z \end{bmatrix}$$

Then, the determinant of the DGT (the Jacobian) can be calculated as:

$$J=det(F)$$

and the degree of regional lung expansion/compression can be determined at each inhale voxel position using the Jacobian. Subsequently, the Lagrangian strain tensor, E, can be calculated as:

$$E = \frac{1}{2}(F^T F - I)$$

where I is the identity matrix, and an eigenvalue decomposition may be performed on the Lagrangian strain tensor to yield three principal strain values ($\lambda_1, \lambda_2, \lambda_3$) corresponding to directions of the principal axes of the reciprocal strain ellipsoid, where the maximum eigenvalue ($\lambda_1$) the medium eigenvalue ($\lambda_2$), and the minimum eigenvalue ($\lambda_3$) are the maximum principal strain, the medium principal strain, and the minimum principal strain, respectively.

Further advantages of the presently-disclosed subject matter will become evident to those of ordinary skill in the art after a study of the description, Figures, and non-limiting Examples in this document.

DESCRIPTION OF EXEMPLARY EMBODIMENTS

Figure 1:
FIG. 1 is a schematic representation of an image registration process of finding a point-to-point mapping between a set of images.

The details of one or more embodiments of the presently-disclosed subject matter are set forth in the attachments to this document. Modifications to embodiments described in these attachments, and other embodiments, will be evident to those of ordinary skill in the art after a study of the information provided in these attachments. The information provided in these attachments, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by one of ordinary skill in the art, definitions are set forth herein to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Optical flow is the pattern of apparent motion of objects, surfaces, and edges in a visual scene caused by the relative motion between an observer and the scene. Image registration, on the other hand, is a process of determining an optimal spatial mapping that matches images collected at different times or using different imaging modalities, and, in certain instances, can include transforming different sets of data into one coordinate system. In certain instances, registration is necessary in order to be able to compare or integrate the data obtained from these different measurements.

In this regard, optimization refers to the selection of a best element from a set of available alternatives. In a simple case, an optimization problem consists of maximizing or minimizing a real function by systematically choosing input values from within an allowed set and computing the value of the function. Generally, optimization includes finding "best available" values of some objective function given a defined domain, including a variety of different types of objective functions and different types of domains. A starting set or sets is often specified by a set of constraints, equalities or inequalities, that the members must satisfy. In some cases, the function is called an energy functional. A feasible solution that minimizes (or maximizes) the objective function is an optimal solution.

(1) Deformable Image Registration

Image registration (IR) problems arise in the context of many different fields. Regardless of the precise context, the IR problem involves description of the relationship between two or more images.

Figure 2:
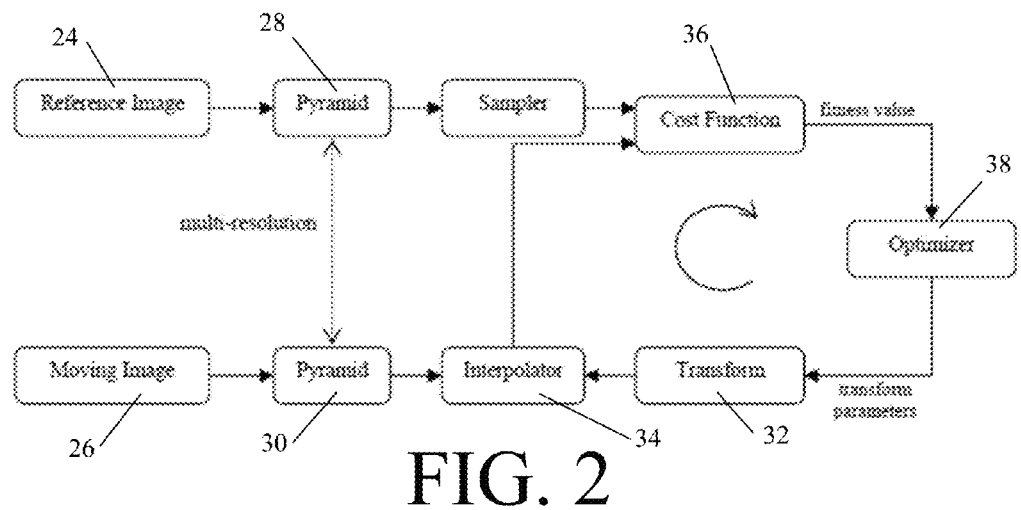
FIG. 2 is a flow chart of the general steps of a parametric registration method.

As shown in FIG. 1, IR is the process of finding a point-to-point pixel (voxel) mapping (correspondence) (point p to point q) between a set of images. This desired mapping (correspondence) should describe the location of each pixel (voxel) in the first image relative to the other images(s). When the mapping contains deformations, it is referred to as deformable image registration (DIR). The output of DIR is the deformation vector field, indicating the correspondence between each voxel in the first image and a corresponding voxel in the second image. The deformation is applied to a moving image in order to simulate a reference image (warping), such that all corresponding voxels have the same coordinates in both images. Registration is the problem of finding a displacement vector that makes the moving image spatially aligned to the reference image. An equivalent formulation is to say that registration is the problem of finding a transformation that makes a transformation of the moving image spatially aligned to the reference image. The quality of a DIR is visualized by computing a difference image between reference and warped image. Indeed, the quality of alignment is defined by a distance or similarity measure, such as the sum of squared differences (SSD), the correlation ratio (CR), or the mutual information (MI) measure. Since this problem is ill-posed for non-rigid transformations, a regularization term is introduced that constrains the possible transformations. Registration is formulated as an optimization problem in which a cost function, or metric, is minimized so as to find the transformation that provides maximum similarity (or minimum distance) between the moving image the reference image:

FIG. 2 shows the general steps of a parametric registration method. A reference image 24 and a moving image 26 are resampled in steps 28 and 30 into different resolutions. Registration of the lower resolution images requires less memory and computational time. The higher resolution images preserve the local details of the anatomical information, but will require significantly more memory and compute time. Commonly, a multi-resolution strategy is employed to speed-up registration and to make it more robust. The transform step 32 is determining how one image can be deformed to match another. The transformation can be rigid which can be described by 6 parameters (3 translations and 3 rotations). It can also be an affine transformation with 12 parameters (3 translations and 9 shear/scaling) for a whole image or it may be a non-rigid registration. An interpolator 34 is used to evaluate the template image intensities at non-integer positions. The cost function component 36 may consist of a single metric such as similarity measure based on geometric and intensity approaches or a compound function with other constraints depending on models that are employed. The cost function 36 measures how well the reference image is matched to the transformed moving template image and is optimized by the optimizer 38 over the search space defined by the parameters of the transform.

Registration of thoracic CT images is of particular interest to the medical community. Since lung motion varies from apex to base and ventral to dorsal, and is nonhomogeneous, the invention uses non-rigid transformations in order to perform temporal registration of the data.

(2) Multi-Scale Optical Flow Method Incorporating Mass Conservation for Deformable Motion Estimation Described below is an exemplary multi-scale optical flow method incorporating mass conservation for deformable motion estimation (referred to hereafter on occasion as "MOFID") from 4-D X-ray CT Images of the Lung 4-D thoracic CT is characterized by both tissue motion as well as respiratory induced changes in the CT image resulting from ventilation. Deformable image registration provides a link between the component phase images for extraction of the motion and physiological information. Registration of 4-D thoracic CT images is specifically difficult due to the compressible nature of the lung and the high computational workload required to handle the massive amount of data.

As discussed below, the original optical flow constraint has been modified and provided with some dedicated lung specific constraints to take advantage of both geometric and intensity features of 4-D CT images of the lung. The described method is a global partial differential equation (PDE) based technique which enforces the governing intensity constancy assumption in standard optical flow, but in addition has a constraint that ensures intensity gradient constancy in consecutive image frames to allow variations in the gray value and to better track vessel and airway boundaries, mass conservation in consecutive volumetric image frames to ensure that the local lung mass is conserved over the entire imaged region, and spatio-temporal smoothness of the deformation map to regularize the estimated motion in order to estimate smooth deformations of the lung in space and time. Taken together, these constraints permit highly accurate estimates of the lung motion between different respiratory phases from 4-D CT images.

An assumption in standard optical flow estimation is grey value constancy, although this assumption is not particularly applicable to lung motion estimation because of changes of voxel intensity (Hounsfield Unit) of lung during respiration. Nevertheless, ideally the gray value of a voxel should not change after displacement:

$$I(X+W)=I(X) \quad (1)$$

In (1) I is the image intensity as a function of space and time, $X:=(x, y, z, t)^T$, and $:=(u, v, w, 1)^T$ is the displacement vector field between two subsequent images. This is a non-linear equation in u, v, and w.

In anatomical CT images, the imaged intensities follow a conservation principle in analogy to mass conservation in fluid flow. Indeed, in certain implementations, it can be shown that if it can be assumed that the Hounsfield unit is proportional to density, then the two conservation principles are equivalent. Application of the conservation principle to a temporally varying image yields:

$$\nabla \cdot (IV) + I_t = 0 \Rightarrow \nabla I \cdot (V) + I(\nabla \cdot V) + I_t = 0 \quad (2)$$

$$I_x u + I_y v + I_z w + I u_x + I v_y + I w_z + I_t = 0 \quad (3)$$

where $V=(u, v, w)$ is the velocity field. Equation (4) is a more general constraint for deformable object motion in comparison to the classic Horn-Schunck optical flow constraint equation shown in (3).

In order to allow variations in the gray value and to help determine the displacement vector by a criterion that favors matching moving edges, a constraint based on image gradients is also incorporated:

$$\nabla I(X+W) = \nabla I(X) \quad (4)$$

Figure 3:
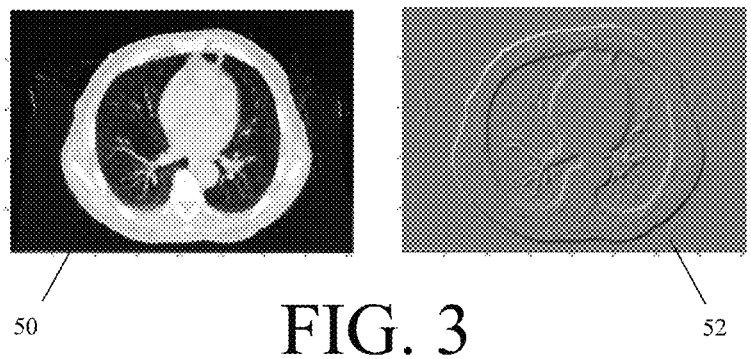
FIG. 3 includes side-by-side images of an axial CT slice of lung and a corresponding gradient image.

FIG. 3 shows an image 50 of an axial CT slice of lung and a corresponding gradient image 52 demonstrating pronouncement of the pulmonary anatomy and bronchial structures. In the exemplary method, the gradient image is used (Equation 4) to take advantage of the rich set of anatomic features of thoracic CT data to match substructures of the pulmonary anatomy in order to align the bronchial structures in two successive respiratory phases.

Finally, in order to regularize the solution, spatio-temporal smoothness of the flow field is adopted. An advantage of this approach proposed for the variational optical flow framework is to smooth out the background noise and preserve true motion boundaries:

$$|\nabla_4 u|^2 + |\nabla_4 v|^2 + |\nabla_4 w|^2 \quad (5)$$

where $\nabla_4 := (\partial_x, \partial_y, \partial_z, \partial_t)^T$ and u, v, and w are components of displacement along x, y, and z. The extension of the spatial smoothness to the spatio-temporal domain in general leads to better estimates due to the additional information exchange along the temporal axis. Therefore, the energy functional that penalizes deviations from these model assumptions is formulated as:

$$E(u,v,w) = \int_{\Omega_t}\int_{\Omega_s}(E_D + \alpha E_s)dvdt = \int_{\Omega_t}\int_{\Omega_s}\psi/I(X+W)-I(X)+\beta(\nabla\cdot V)|^2 + \gamma|\nabla I(X+W)-\nabla I(X)|^2] + \alpha(\psi[|\nabla_4 u|^2 + |\nabla_4 v|^2 + |\nabla_4 w|^2])dvdt \quad (6)$$

where $\Omega_s$ is the volume over which the motion is to be estimated and $\Omega_t$ is the temporal sequence of volumetric lung images. The function $\psi(s^2) = \sqrt{s^2 + \epsilon^2}$ is a modified $L_1$ norm, where $L_1$ norm is $|s|$ or $\psi(s^2)$ with $\epsilon=0$, which is convex and yields robustness to outliers in the minimization process. Since $\epsilon$ is only utilized for numerical reasons to avoid dividing by zero, it can be set to a fixed value (e.g., 0.001). β can only be zero or one: zero when the object is incompressible and one when the object is compressible (for the thoracic CT application β is always one).

A numerical solution is obtained by discretizing the energy function (6) with all image derivatives approximated by finite differences. Having adopted the finite difference approximation proposed by Weickert et al. (J. Weickert, and C. Schnorr, "Variational optic flow computation with a spatio-temporal smoothness constraint," J. Math. Imaging and Vision, vol. 14, no. 3, pp. 245-255, 2001), discretization of the energy function in equation (6) yields a linear system of equations, which can be iteratively solved by Successive Over Relaxation (SOR) (W. H. Press, B. P. Flannery, S. A. Teukolsky et al., Numerical Recipes in C: The Art of Scientific Computing: Cambridge University Press, 1988). It can be shown that the energy function for MOFID will be simplified to the modified volumetric version of the method proposed by Brox et al. (T. Brox, A. Bruhn, N. Papenberg et al., "High accuracy optical flow estimation based on a theory of warping," in ECCV. 2004, pp. 25-36) when β=0, while it would result in the modified volumetric version of the Wildes method (R. P. Wildes, M. J. Amabile, A.-M. Lanzillotto et al., "Recovering estimates of fluid flow from image sequence data," Computer Vision and Image Understanding, vol. 80, no. 2, pp. 246-266, 2000) with γ=0. In the simplest form, with both β=0 and γ=0, MOFID simplifies to the modified version of Horn-Schunck method (B. K. P. Horn, and B. G. Schunck, "Determining optical flow," Artificial Intelligence, vol. 17, pp. 185-203, 1981), though in the latter case includes spatio-temporal smoothness.

A multiresolution strategy helps to improve the computational efficiency as well as to deal with larger displacements which may be encountered due to limited number of imaged respiratory phases (Y. Yin, E. A. Hoffman, and C.-L. Lin, "Local tissue-weight-based nonrigid registration of lung images with application to regional ventilation," in SPIE Conf. Medical Imaging. 2009, pp. 72620C). In the multiresolution framework, both images are first downsampled and then registered. Once the registration has been completed, the deformation field is upsampled and the calculated deformation field is then propagated to the next finer level and used as the initial transformation for that level. While the proposed method results in accurate lung motion estimation, the number of weighting factors—that is α, γ, and 1—(number of multi-scale level) and their various combinations is a significant challenge. To find the optimum weights, normalized mutual information (NMI) (C. Studholme, D. L. G. Hill, and D. J. Hawkes, "An overlap invariant entropy measure of 3D medical image alignment," Pattern Recognition, vol. 32, no. 1, pp. 71-86, 1999) has been used as a similarity measure between the first frame warped with the calculated motion field and the second frame. NMI is used here as the yardstick to compare the accuracy of the estimated motion for different weighting factors (C. Hua-Mei, P. K. Varshney, and M. K. Arora, "Performance of mutual information similarity measure for registration of multitemporal remote sensing images," IEEE Transactions on Geoscience and Remote Sensing, vol. 41, no. 11, pp. 2445-2454, 2003; L. Papp, M. Zuhayra, E. Henze et al., "Extended normalized mutual information for lung SPECT-CT registration," in Bioinformatics and Biomedical Engineering, 2009. ICBBE 2009. 3rd International Conference on, 2009, pp. 1-3).

Figure 4:
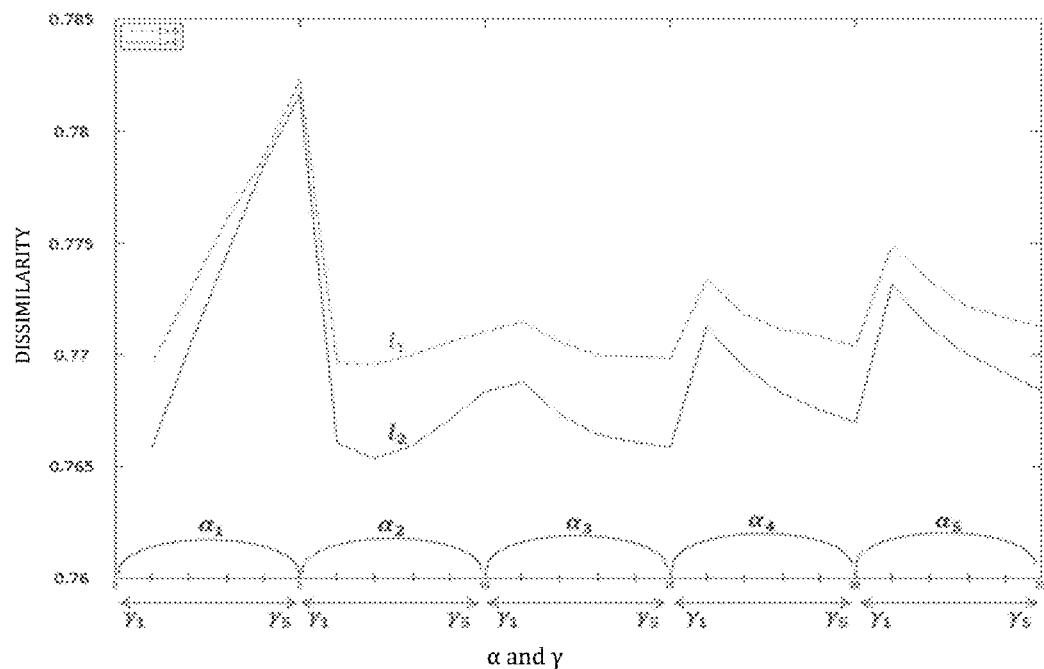
FIG. 4 is a graph of a similarity calculation between a first warped image and a second image corresponding to two consecutive respiratory phase of a model for five different α values.

FIG. 4 is a graph of a dissimilarity value calculation (vertical axis) between the first warped image and the second image corresponding to two consecutive respiratory phase of POPI-model for five different α values, that is from 10 to 50 (increments by 10) (horizontal axis), and five different α, that is from 50 to 210 (increments by 40) (also horizontal axis) and for l=5, 6, which corresponds to the number of levels in the pyramid. Note that the smaller the value of the plot, the higher the similarity.

As shown in FIG. 4, $\alpha_2$ and $\alpha_3$ have a better range of similarity value. For α values less than this range, the regularization term may not be effective in the energy function while α values larger than this range give undue importance to the smoothness term, undermining the importance of the main data term. For a specific α value, the γ value primarily improves the similarity value with incorporation of anatomical feature information. Based on FIG. 4, and between the first and the second image of the POPI-model, the combination of $(\alpha_2, \gamma_2, l_2)$ leads to a better estimation of the deformation map. With a coarse to fine strategy, one can get the optimum combination of scalar weights for the energy function. However, there needs to be a compromise between the accuracy of the deformation map and the timing cost of the calculation.

A continuity equation-based mass conservation and gradient constancy in the optical flow framework as well as use of spatio-temporal smoothness for thoracic 4-D CT images thus extends and improves prior efforts in measuring and modeling of lung motion. Since the method is capable of accurately modeling the respiratory motion and in estimating the lung deformation field from 4-D CT images, it is also adaptable to the study of regional ventilation and mechanics, as described below.

(3) Method of Determining Regional Lung Function

Described below is an exemplary objective method with which to evaluate and follow the progression of disease based on measurement of regional mechanics. Regional ventilation may be used for tracking the progression of radiation induced toxicity to nearby normal tissue during radiation therapy and can be used to evaluate treatment planning methods to reduce radiation toxicity to the lung and surrounding tissues.

4-D CT images can be used to derive measures of ventilation in lung cancer patients. To date, two classes of metrics have been used in ventilation imaging: Hounsfield unit (HU) change and Jacobian of the deformation field. Both metrics are based on the assumption that regional ventilation is proportional to the regional volume/density change. Although Jacobian shows correlation with pulmonary function scans, it also has discrepancies based on the deformable image registration algorithms and ventilation metrics.

Strain is a dimensionless quantity representing the percent change in length of a continuously deformable body. Presented below is a novel method of quantification of motion and mechanical strain in the lung from treatment planning 4-D X-ray CT images using a lung specific multi-scale optical flow deformable image registration method (MOFID), as discussed above. However, one of skill in the art will recognize that the method described is applicable to any optical flow field, however derived. Subsequently presented in the Example section are the evaluation and physiologically validation of the correlation of the calculated strain parameters with both tomographic SPECT ventilation ($V_{SPECT}$) and tomographic SPECT perfusion ($Q_{SPECT}$) scans in seven lung cancer patients and showed quantitative results of the comparison of mechanical strain as a novel index of regional lung functionality with previously established Jacobian of deformation.

Following 4-D CT data collection, the previously introduced multi-scale optical flow deformable image registration method (MOFID) was used to create a spatial voxel-wise deformation map. MOFID provides the possibility to enforce physical constraints on the flow field and has been extensively validated on eleven annotated 4-D CT data sets (POPI-model and DIR-lab data sets). The volumetric images of expiratory phases are registered pairwise to calculate the deformation field between the max-inhale and max-exhale respiratory phases of 4-D CT images through composition of pairwise calculated deformations, (u, v, w).

Subsequently, the deformation gradient tensor (DGT) is calculated:

$$F = \begin{bmatrix} 1+u_x & u_y & u_z \\ v_x & 1+v_y & v_z \\ w_x & w_y & 1+w_z \end{bmatrix} \quad (7)$$

Various kinematic descriptors of deformation can be calculated from the DGT. Because of the need for one-to-one correspondence between material points during continuous deformation, the determinant of the DGT, normally referred to as the Jacobian, has to be nonzero:

$$J = det(F) \quad (8)$$

In addition, in the absence of any deformation, the Jacobian is equal to unity. Since, the deformation is assumed to be a continuous function of time, it is impossible for the Jacobian to be negative without passing through zero which was previously excluded from physical possibility. It therefore follows that for a continuous deformation to be physically possible, the Jacobian must be greater than zero. The degree of regional lung expansion is measured using the Jacobian of the displacement field which is directly related to specific volume change. If the Jacobian is unity, there is no local expansion or contraction. If the Jacobian is greater than one, there is local tissue expansion; if the Jacobian is less than one, there is local tissue contraction.

DGT can be decomposed into stretch and rotation components:

$$F = RU \quad (9)$$

where the U is the right stretch tensor and R is an orthogonal rotation tensor. The Cauchy-Green deformation tensor is defined as:

$$c = F^T F = U^2 \quad (10)$$

The concept of strain may be used to evaluate how much a given displacement differs locally from a rigid body displacement. The Lagrangian strain tensor, E, is then given by:

$$E = \frac{1}{2}(F^T F - I) \quad (11)$$

where I is the identity matrix. From the Lagrangian strain tensor, the various normal, shear, and principal strain values can be calculated, which describe the regional deformation of the element.

Eigenvalue decomposition on the Lagrangian strain tensor yields the three principal strain values, ($\lambda_1, \lambda_2, \lambda_3$). The principal strain vectors are the corresponding eigenvectors and correspond to the directions of the principal axes of the reciprocal strain ellipsoid. The maximum ($\lambda_1$), medium ($\lambda_2$), and minimum eigenvalue ($\lambda_3$) are called the maximum, medium, and minimum principal strain, respectively. The maximum principal strain relates to maximum elongation and the minimum strain relates to maximum compression.

The presently-disclosed subject matter is further illustrated by the following specific but non-limiting examples. Some of the following examples may include compilations of data that are representative of data gathered at various times during the course of development and experimentation related to the present invention.

EXAMPLES

Example 1

Multi-Scale Optical Flow Method Incorporating Mass Conservation for Deformable Motion Estimation For both qualitative and quantitative evaluation of the exemplary method described herein, the publicly available POPI-model (J. Vandemeulebroucke, D. Sarrut, and P. Clarysse, "The POPI-model, a point-validated pixel-based breathing thorax model," in International Conference on the Use of Computers in Radiation Therapy (ICCR), Toronto, Canada, 2007) and DIR-lab (R. Castillo, E. Castillo, R. Guerra et al., "A framework for evaluation of deformable image registration spatial accuracy using large landmark point sets," Physics in medicine and biology, vol. 54, no. 7, pp. 1849-1870, 2009) data of lung deformation has been used. In the POPI-model dataset, 41 homologous landmarks were defined by experts in each of the ten respiratory phases of a single individual that make up this 4-D CT dataset with voxel dimensions 0.97×0.97×2 mm and made up of 512×512×141 voxels. For the DIR-lab data, 75 landmarks for each time point between time phases P00 and P50 are available (corresponding to end-inspiration to end-expiration; there are 10 phases in the data starting with phase P00 to phase P90). DIR-lab data has ten 4-D CT lung images from patients treated for thoracic malignancies. The 4-D image characteristics of the ten cases utilized in this study are given in Table 1. For both the POPI-model and DIR-lab data sets, the landmark locations are from all around the lung, including the lung boundaries.

Table 1 shows the spatial accuracy of the mass preserving optical flow algorithm for the 75 landmarks and six time points of DIR-lab data sets. Average spatial errors are reported in millimeters with standard deviation (SD) in parentheses. The fourth column exhibits the average landmark displacements before registration. The fifth column represents the errors subsequent to deformable registration.

TABLE 1

| Patient | Image dimension | Voxel dimension (mm) | Average Landmark displacements | Average registration error |
|---|---|---|---|---|
| Case 1 | 256 × 256 × 94 | (0.97 × 0.97 × 2.5) | 4.01 (2.91) | 0.91 (0.9) |
| Case 2 | 256 × 256 × 112 | (1.16 × 1.16 × 2.5) | 4.65 (4.09) | 1.08 (1.06) |
| Case 3 | 256 × 256 × 104 | (1.15 × 1.15 × 2.5) | 6.73 (4.21) | 1.52 (1.15) |
| Case 4 | 256 × 256 × 99 | (1.13 × 1.13 × 2.5) | 9.42 (4.81) | 1.91 (1.39) |
| Case 5 | 256 × 256 × 106 | (1.10 × 1.10 × 2.5) | 7.10 (5.14) | 1.66 (1.45) |
| Case 6 | 512 × 512 × 128 | (0.97 × 0.97 × 2.5) | 11.10 (6.98) | 2.05 (1.75) |
| Case 7 | 512 × 512 × 136 | (0.97 × 0.97 × 2.5) | 11.59 (7.87) | 2.03 (1.51) |
| Case 8 | 512 × 512 × 128 | (0.97 × 0.97 × 2.5) | 15.16 (9.11) | 2.5 (1.85) |
| Case 9 | 512 × 512 × 128 | (0.97 × 0.97 × 2.5) | 7.82 (3.99) | 1.49 (0.95) |
| Case 10 | 512 × 512 × 120 | (0.97 × 0.97 × 2.5) | 7.63 (6.54) | 1.71 (1.38) |

Discussed below are two evaluation measures for both POPI-model and DIR-lab data: the primary measure is the accuracy of the registration results and the secondary measure is physical plausibility of the computed deformation.

To measure the accuracy of the registration results, the computed transformation to the ground truth point set from consecutive phases was applied, and estimated positions to the actual positions of the ground truth points were compared. The differences between the estimated positions with the actual position referred to as ground truth discrepancies or target registration error (TRE). The registration result was reported as $\bar{\mu}_{gt} \pm \sigma_{\mu_{gt}}$ where $\bar{\mu}_{gt}$ denotes the average of all ground truth discrepancies and $\sigma_{\mu_{gt}}$ is the standard deviation.

Figure 5:
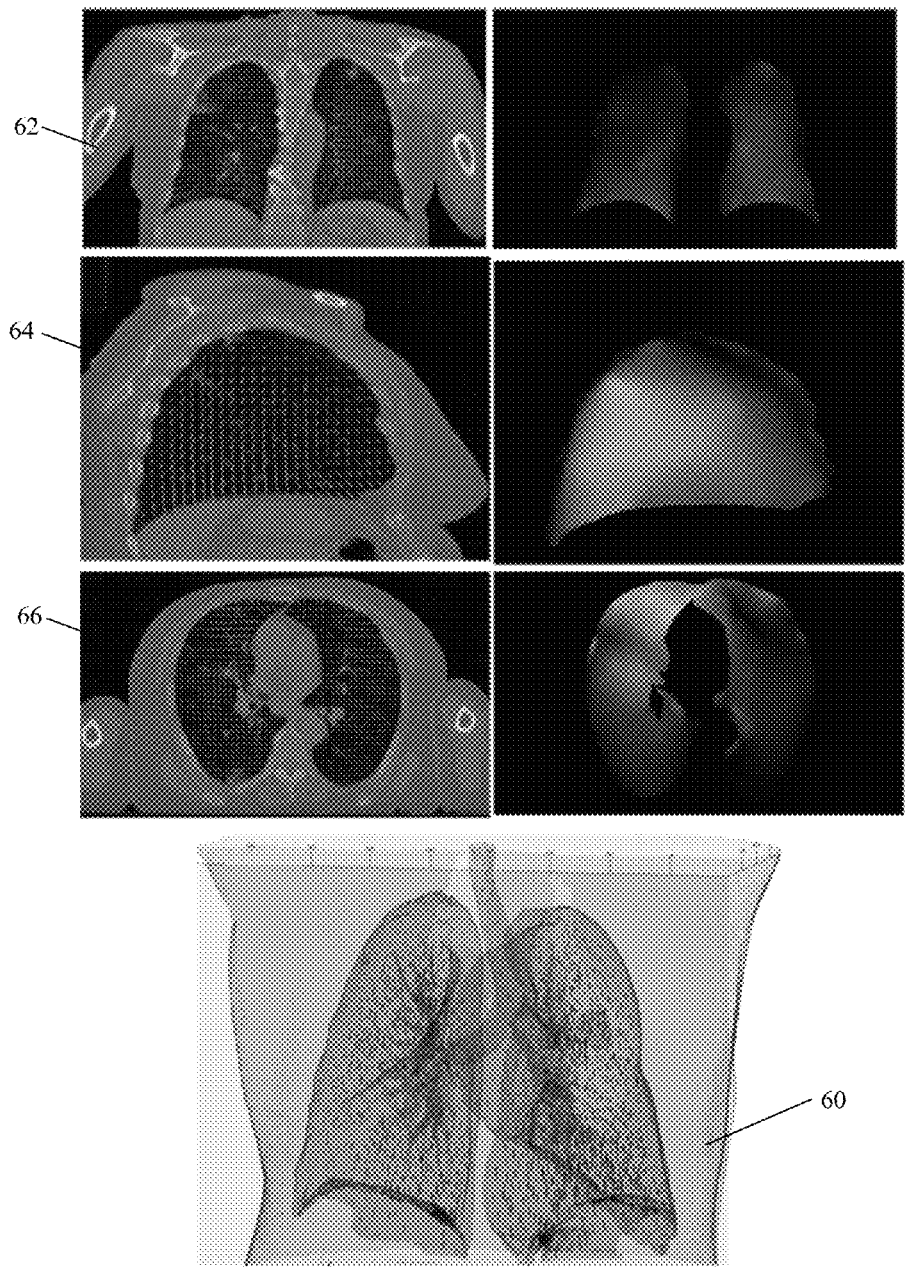
FIG. 5 includes a set of images showing a calculated motion field of a model dataset between two consecutive respiratory phases in volumetric form as well as all three anatomical orientations.

FIG. 5 presents the calculated motion field of POPI-model dataset between two consecutive respiratory phases P30 and P40 in volumetric form 60 as well as all three anatomical orientations 62, 64, 66. The mid-coronal view 62, mid-sagittal view 64, and mid-axial view 66 for P30 are shown. The projection of the motion field has been superimposed on the P30 views. Adopting the NMI-based method to find the optimum weights, α, γ, and β were chosen to be 25, 80, and 1, respectively and three scales were used in the multi-scale strategy. Considering all 9 registrations of the POPI-model, the average 3-D Euclidean distance between the computed and actual ground truth points with the proposed optical flow method was 1.02±0.70 mm (3.3±2 mm was the mean landmark distance without registration). The average computational time to arrive at the motion field between two volumetric frames was 74 minutes on a Dell 5160 machine with a quad-core Xeon 3.00 GHz processor. A similar qualitative evaluation of the method for the 75 landmarks in six time points of the DIR-lab data is summarized in Table 1. Similarly, adopting the method, α, γ, and β were chosen to be 10, 110, and 1, respectively and three scales were used in the multi-scale strategy.

The physical plausibility of the deformation field was measured using the determinant of the Jacobian of the deformation field which is directly related to specific volume changes (J. M. Reinhardt, K. Ding, K. Cao et al., "Registration-based estimates of local lung tissue expansion compared to xenon-CT measures of specific ventilation," Medical Image Analysis, vol. 12, no. 6, pp. 752-763, 2008). If the Jacobian is unity, there is no local expansion or contraction. If the Jacobian is greater than one, there is local tissue expansion; if the Jacobian is less than one, there is local tissue contraction. In particular, it was thought that the calculated deformation field was bijective. Regions where the deformation field was not bijective has a Jacobian determinant of zero and is a singularity (K. Murphy, B. van Ginneken, J. Reinhardt et al., "Evaluation of registration methods on thoracic CT: The EMPIRE10 challenge," IEEE Transactions on Medical Imaging, vol. 30, no. 11, pp. 1901-1920, 2011). Additionally, a negative Jacobian implies a deformation that is physically not permissible.

Figure 6:
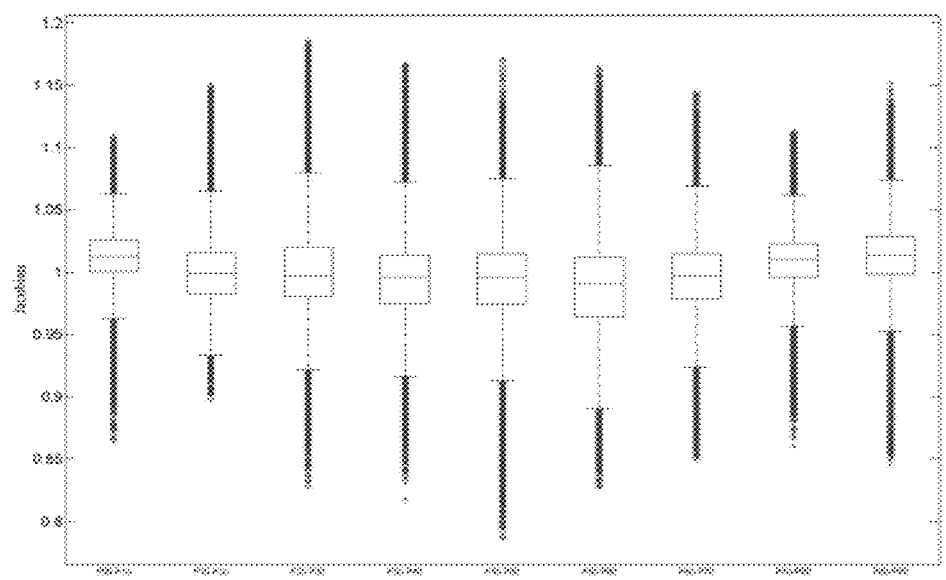
FIG. 6 is a box plot of a Jacobian value for each of 9 calculated deformation maps between successive respiratory phases of the model dataset.
Figure 7:
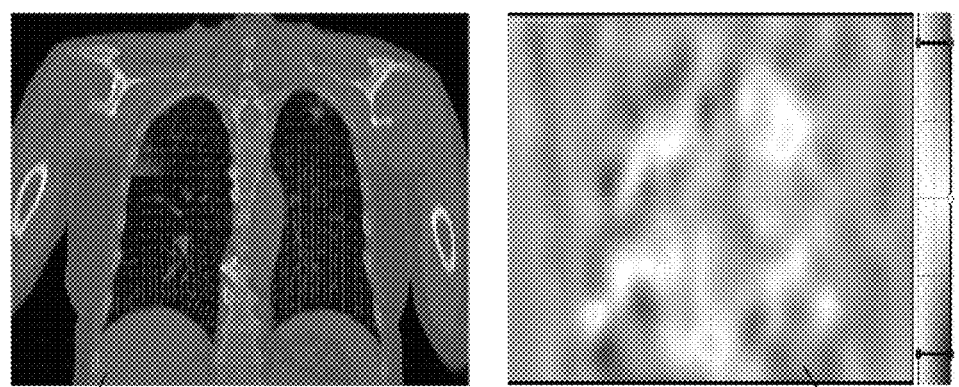
FIG. 7 includes side-by-side images of a mid-coronal plane of the calculated motion field of FIG. 5, and a related Jacobian image.

FIG. 6 shows box plot of the Jacobian value for each of the 9 calculated deformation maps between successive respiratory phases of the POPI-model data. For each box, the central mark is the median of all computed values, the edges of the box are the 25th and 75th percentiles, the whiskers extend to the most extreme data points not considered outliers, and outliers are plotted individually FIG. 7 shows the mid-coronal plane of the calculated motion field 72 of FIG. 5 between phases P30 and P40, and the related Jacobian image 74.

Figure 8:
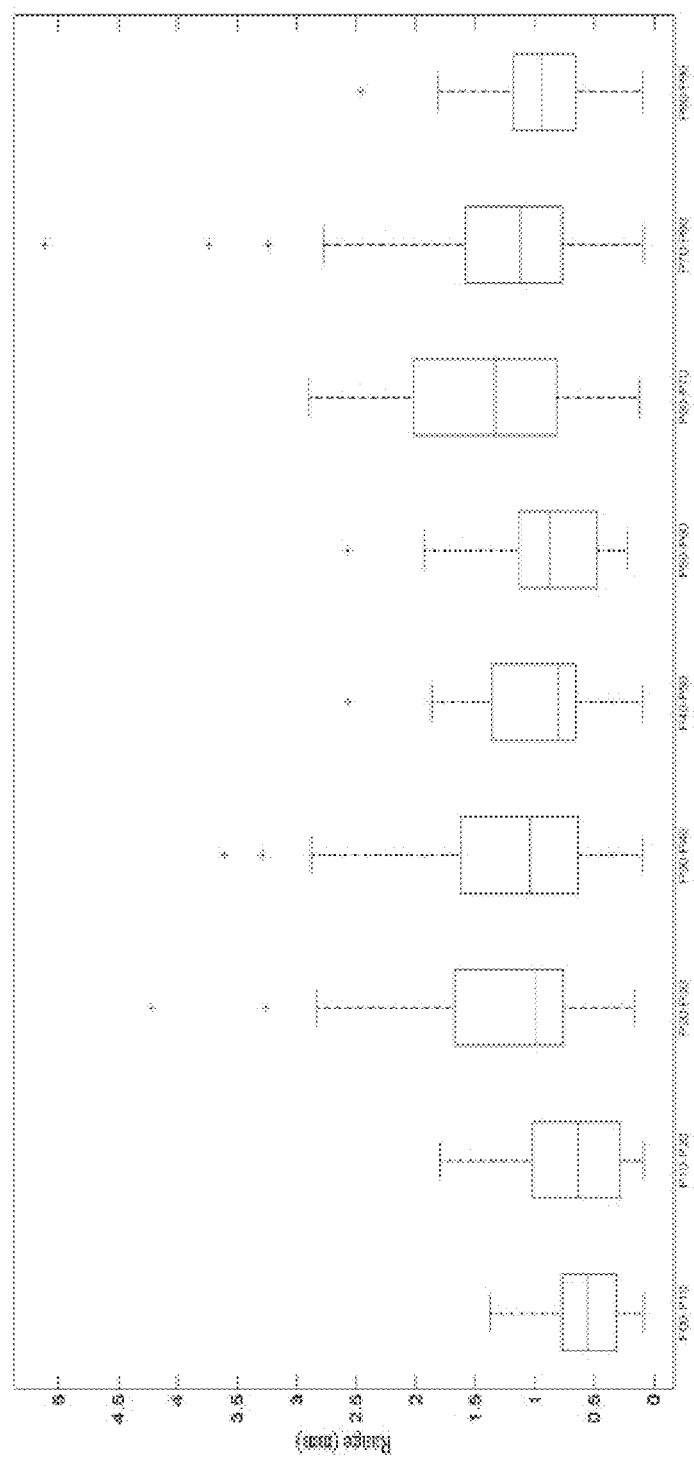
FIG. 8 is a graph of an error range at each two successive respiratory phases for the model dataset, using a cumulative set of 41 annotated landmarks.
Figure 9A:
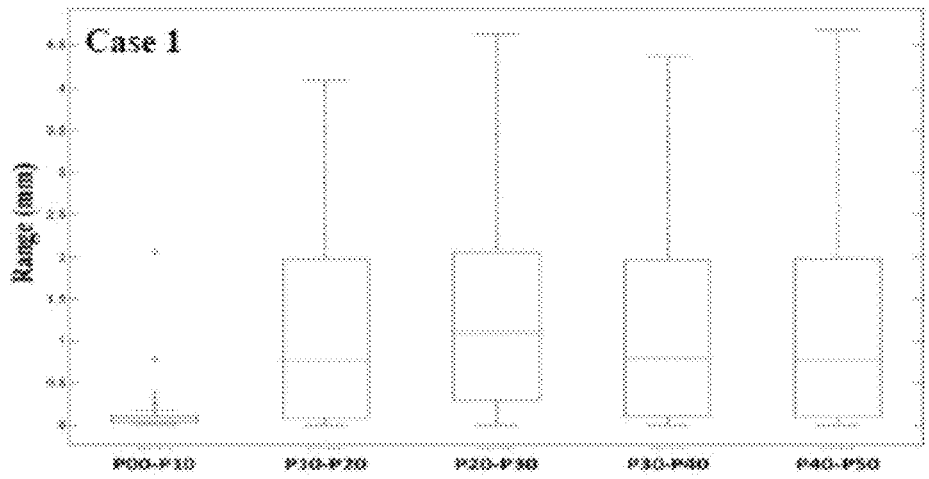
FIGS. 9A-9J includes graphs of the error range at each of two successive respiratory phases from end of inspiration to the end of expiration, using a cumulative set of 75 annotated landmarks for 10 other model dataset.
Figure 9B:
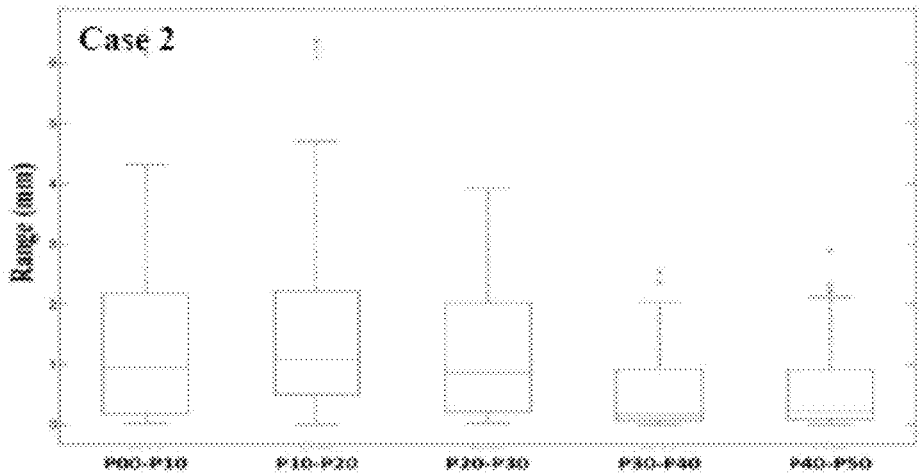
Figure 9C:
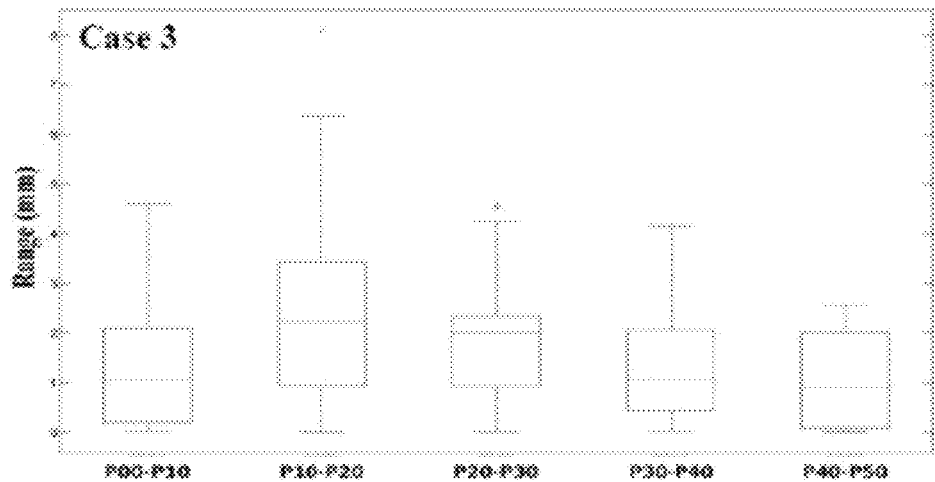
Figure 9D:
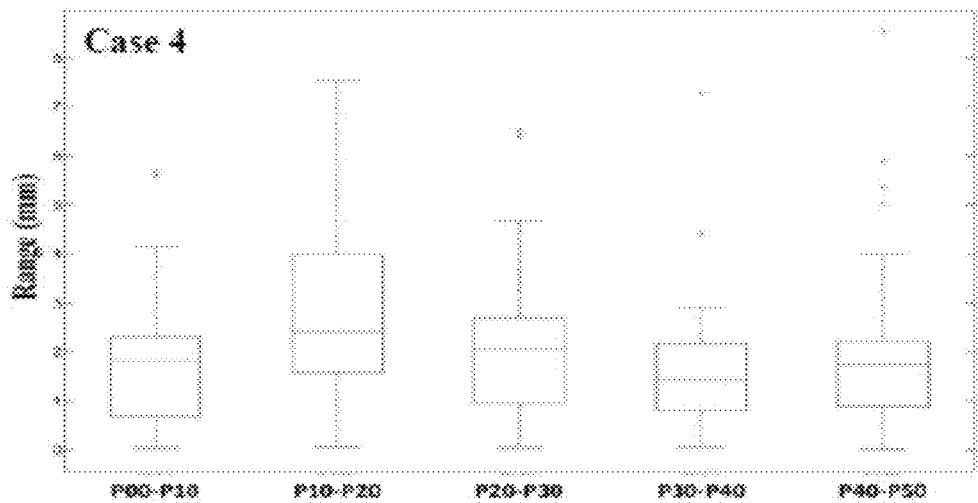
Figure 9E:
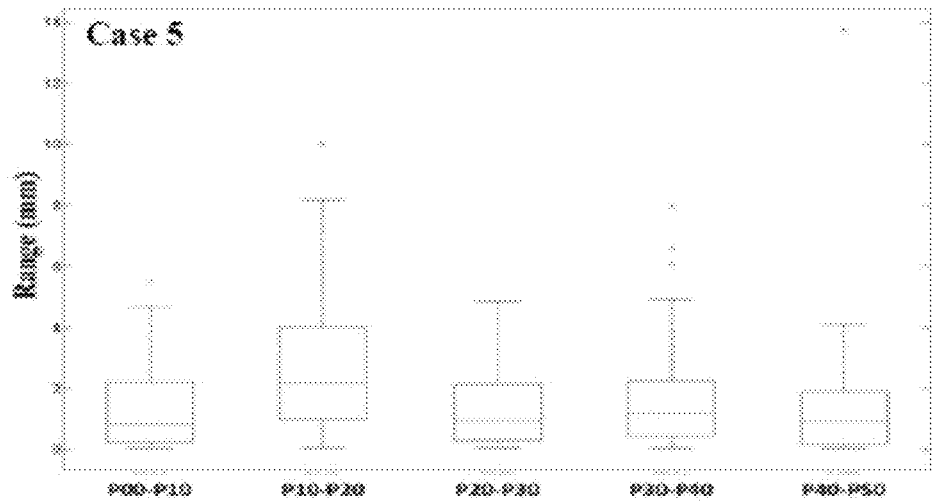
Figure 9F:
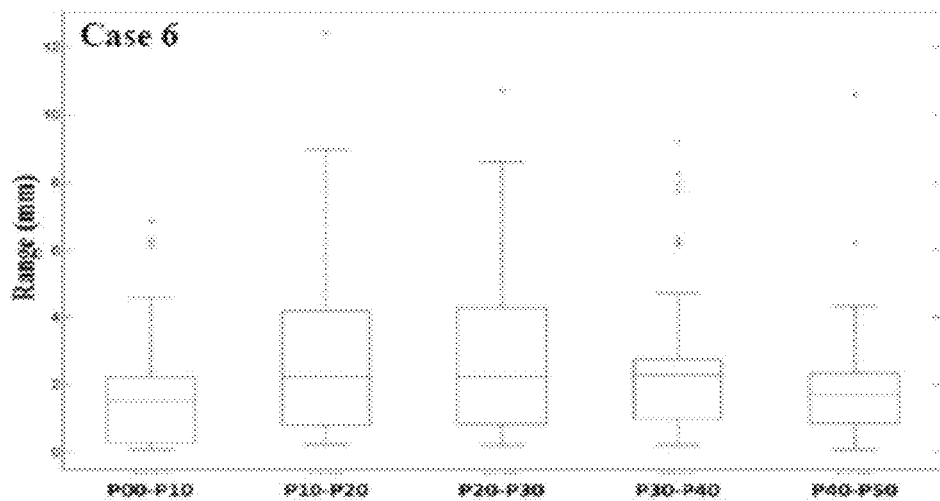
Figure 9G:
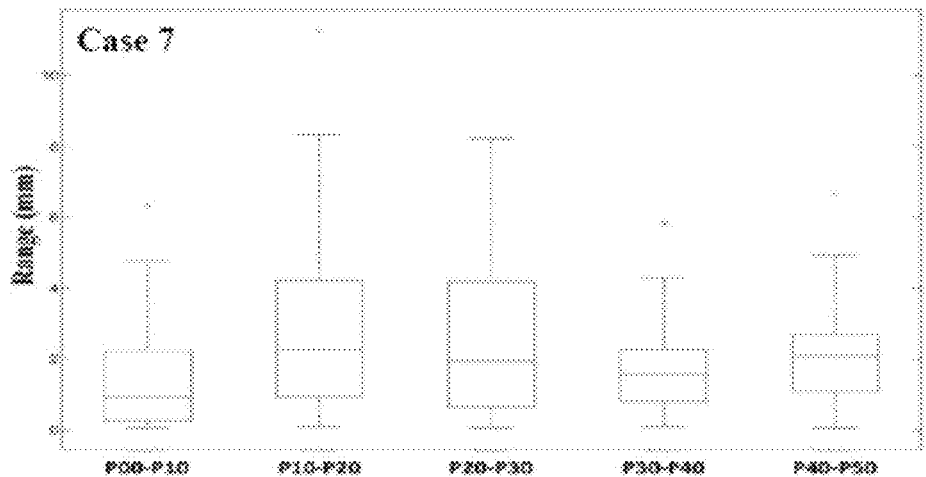
Figure 9H:
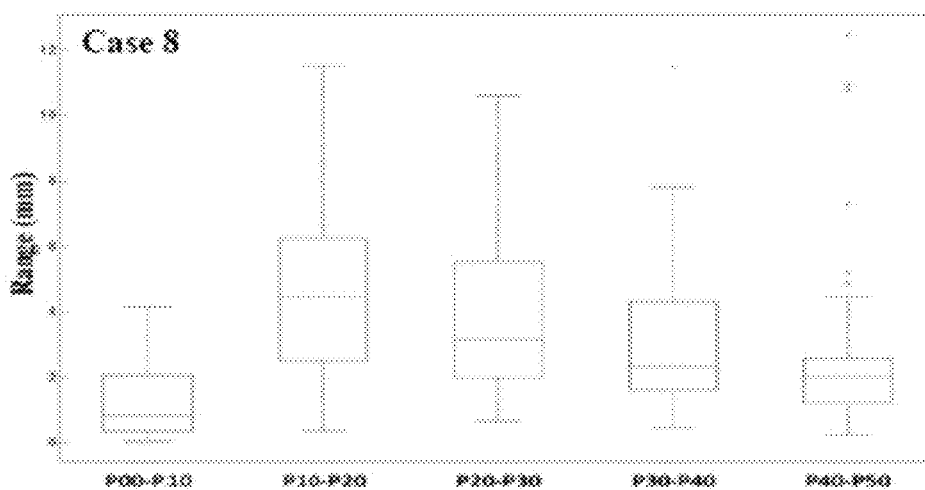
Figure 9I:
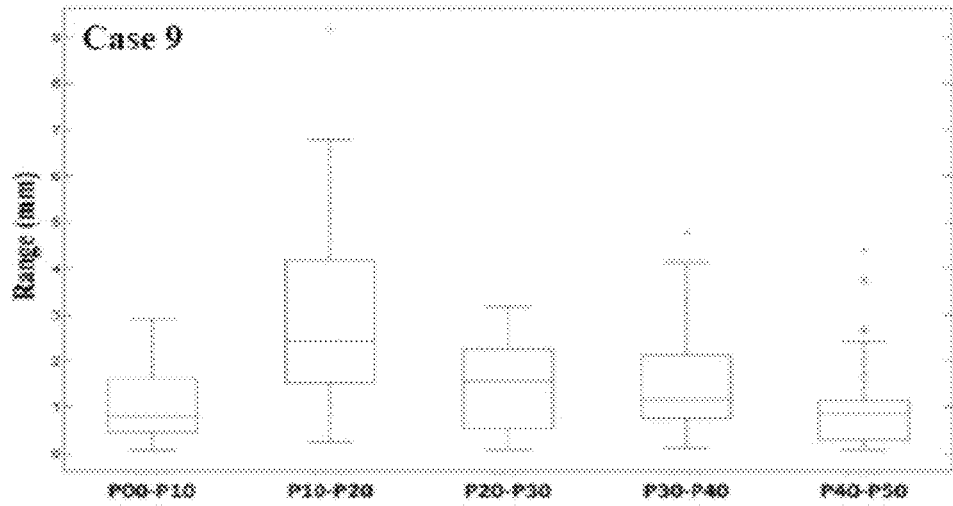
Figure 9J:
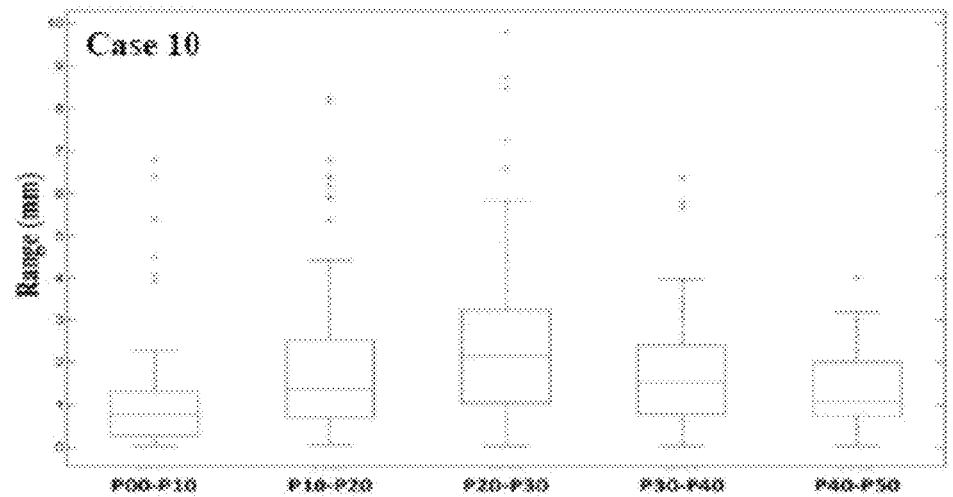

FIG. 8 shows a box plot of the error range at each two successive respiratory phases for POPI-model data, using the cumulative set of all 41 annotated landmarks. A trend toward bigger magnitude errors between phases P20 and P30 at exhale as well as P60 and P70 at inhale is visually apparent, consistent with the correlation between landmark displacements between each two successive respiratory phases (J. Vandemeulebroucke, D. Sarrut, and P. Clarysse, "The POPI-model, a point-validated pixel-based breathing thorax model," in International Conference on the Use of Computers in Radiation Therapy (ICCR), Toronto, Canada, 2007).

FIGS. 9A-9J show similar box plots of the error range at each of two successive respiratory phases from end of inspiration to the end of expiration, using the cumulative set of all 75 annotated landmarks for all 10 DIR-lab data sets. As expected, a similar trend toward a bigger TRE for the respiratory phases with bigger displacement can be seen here.

A highly versatile deformable thoracic registration technique which utilizes image intensities without any preprocessing is described above. The described method enforces the intensity constancy constraint in standard optical flow, but in addition has a constraint that ensures intensity gradient constancy in consecutive image frames, mass conservation between volumetric frames, and spatio-temporal smoothness of the deformation maps. Included in the lung-specific energy function is the novel combination of those terms in a multi-resolution framework. Further differences include, for example, the compressible optical flow approach of Wildes et al. (see citation above) was applied in 2-D and was not lung-specific. Indeed as demonstrated, the constraints and formulation utilized herein permit highly accurate estimates of the lung motion between different respiratory phases from 4-D CT images. Also, it is noted that the purpose of the method was determining small deformations as, for example, observed between 3-D CT image volumes from successive phases of the respiratory cycle, and not, for example, large deformations as seen between max-inhale and max-exhale phases.

Extensive validation of the method is described above. Expert-determined sets of anatomical landmark feature pairs have become common for evaluating deformable image registration spatial accuracy, particularly in the context of clinically acquired thoracic images. The average resulting error of the method (identified as MOFID) over the expert-defined homologous landmarks was found to be comparable to previously reported optical flow registration methods, as shown below in Table 2.

TABLE 2

| Patient | Voxel dimension (mm) | Average Landmark displacements | Average registration error |
|---|---|---|---|
| Case 1 | (0.97 × 0.97 × 2.5) | 4.01 (2.91) | 1.17 (1.07) COF |
|  |  |  | 1.02 (1.03) CCLG |
|  |  |  | 0.91 (0.9) MOFID |
| Case 2 | (1.16 × 1.16 × 2.5) | 4.65 (4.09) | 1.37 (1.27) COF |
|  |  |  | 1.29 (1.22) CCLG |
|  |  |  | 1.08 (1.06) MOFID |
| Case 5 | (1.10 × 1.10 × 2.5) | 7.10 (5.14) | 2.57 (1.85) COF |
|  |  |  | 2.50 (1.91) CCLG |
|  |  |  | 1.66 (1.45) MOFID |

Table 2 compares the spatial accuracy of the method (MOFID) in comparison with a compressible optical flow (COF) method and a compressible combined local global (CCLG) method. Castillo et al. (E. Castillo, R. Castillo, Y. Zhang et al., "Compressible image registration for thoracic computed tomography images," Journal of Medical and Biological Engineering, vol. 29, no. 5, pp. 236-247, 2009) proposed the combined compressible local global (CCLG) method and achieved mean registration 1.02±1.03 mm, 1.29±1.22 mm, and 2.50±1.91 mm on first, second, and fifth case of DIR-lab, respectively. The compressible optical flow method by Wildes (M. Staring, S. Klein, J. H. C. Reiber et al., "Pulmonary image registration with elastix using a standard intensity-based algorithm," in Medical Image Analysis for the Clinic: A Grand Challenge. 2010, pp. 73-79) achieved 1.17±1.07 mm, 1.37±1.27 mm, and 2.57±1.85 mm of error for same dataset. It is not believed that performance of CCLG and COF methods have been reported on the remaining seven DIR-lab data sets.

The above-described results, which were determined from all 10 available DIR lab data sets, improve on previously reported values and describe the use of physical constraints in the above-described numerical implementation. The incorporated spatio-temporal regularization in the optical flow formulation forces the deformation to be continuous and differentiable in both the spatial and temporal domain in addition to helping to alleviate motion artifact inherent to dynamic images as well as avert singularities in Jacobian of the deformation. The temporal smoothness is regulated to take into account the expected smoothness of the motion of the lung so as not to sacrifice the registration accuracy. Therefore, the optimum and effective incorporation of the aforementioned assumptions in the optical flow energy function is nontrivial. The NMI-based method has been described to find the optimum combination of weighting parameters.

Figure 10:
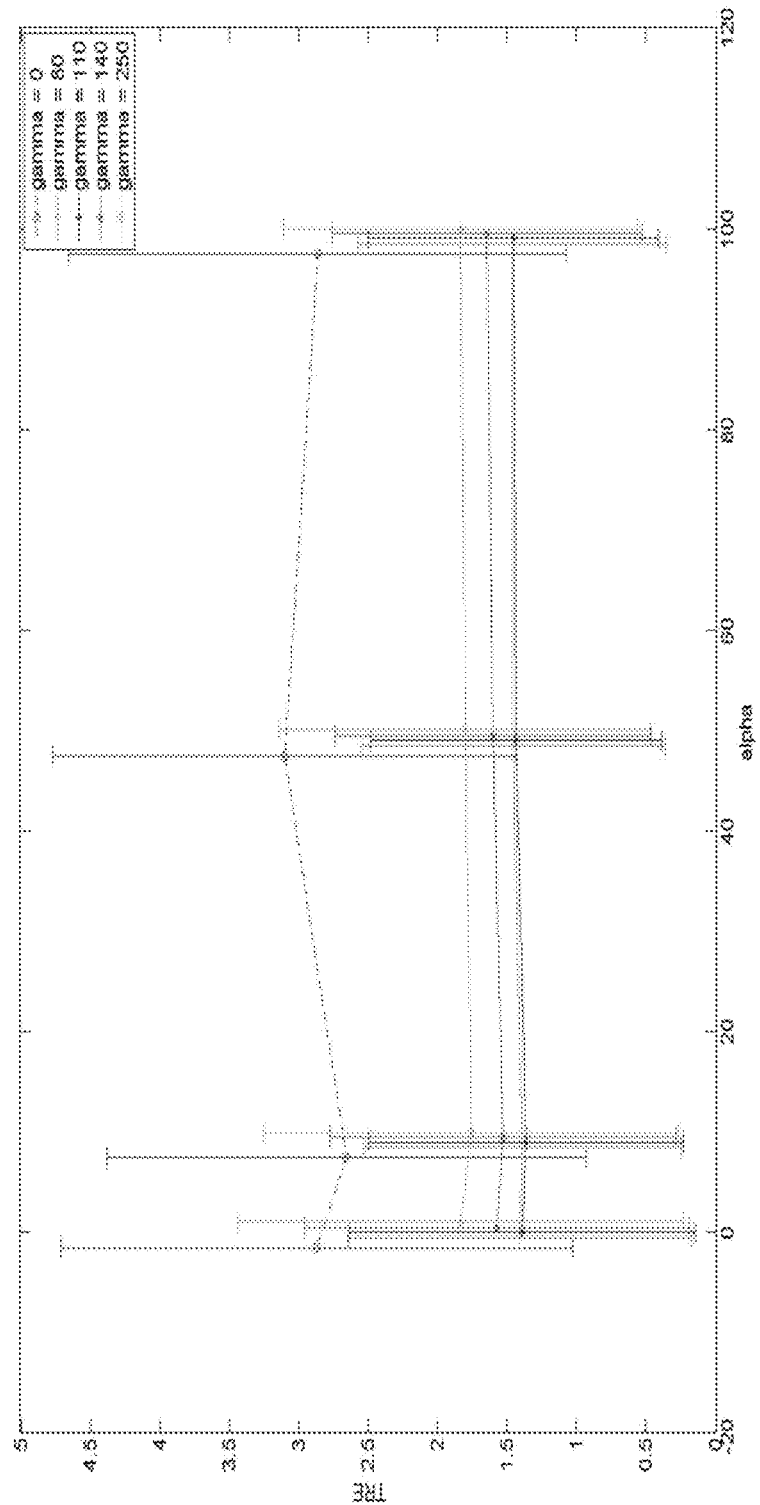
FIG. 10 is a graph of a sensitivity value of total registration error (TRE) to different combination of α and γ values.

FIG. 10 shows the sensitivity of total registration error (TRE) to different combination of $\alpha$ and $\gamma$ values which set the importance of the regularization and gradient terms. The error bars show the mean and error range of TRE in mm in terms of four different $\alpha$ values, 1, 10, 50, and 100 and five different $\gamma$ values, 0, 80, 110, 140, and 250 over all 41 annotated landmarks for POPI-model between phases P30 and P40 volumetric frames. Sensitivity of TRE to $\alpha$ and $\gamma$ values has been evaluated for motion estimation between phases P30 and P40 which exhibits the largest deformation of all the exhale phases of the respiratory cycle (see FIG. 8). Based on FIG. 10 and as expected, changing $\alpha$ has an impact on TRE because of the resulting increase in effectiveness of the regularization term in the energy function. For $\alpha$ values less than 10, the regularization term is not effective enough and TRE starts to grow. $\alpha$=10 has been a sufficient choice in terms of the mean and error range of TRE. On the other hand, specific values for $\gamma$ (shown here) plays a role on TRE value. Indeed, turning off the gradient constancy term by setting $\gamma$=0 leads to the largest value for TRE.

Figure 11:
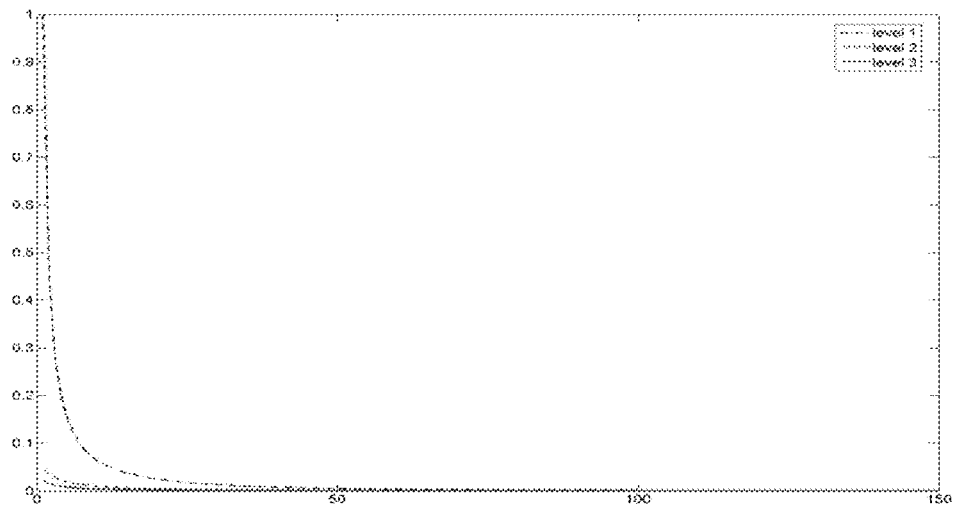
FIG. 11 is a graph of the convergence behavior of the multi-scale optical flow method incorporating mass conservation for deformable motion estimation, which iteratively arrives at a final solution.

The convergence behavior of MOFID, which iteratively arrives at the final solution based on the SOR method [88], has also been evaluated. FIG. 11 shows the convergence behavior of the method (MOFID) which iteratively arrives at the final solution based on the SOR method. FIG. 11 plots the normalized difference between the value of the energy function (equation (6)) in terms of SOR iterations $$\left(\frac{\|E_{i+1} - E_i\|}{\|E_i\|}\right)$$

for motion estimation between phases P30 and P40 of the POPI-model data at three scales. This calculated value has been employed as a criteria for the number of SOR iterations.

Example 2

Method of Determining Regional Lung Function

Seven patients with non-small cell lung cancer (NSCLC) who were scheduled to receive thoracic radiotherapy were enrolled in a study and imaging was performed prior to the initiation of treatment. 4-D CT data were collected with 1.17× 1.17×3 mm voxel dimension using a Philips Brilliance Big Bore CT scanner and the Varian Real-time Position Management (RPM) system (Varian Medical Systems, Palo Alto, Calif.) to record patient respiratory traces in the Department of Radiation Oncology at University of Louisville. An audio-visual feedback device was utilized to ensure a reproducible and consistent respiratory cycle waveform to ensure fidelity of the 4-D CT data. For each patient, 4-D CT images of the entire thorax and upper abdomen were obtained.

Each patient also received tomographic SPECT ventilation/perfusion lung imaging on a Philips ADAC Sky-light Dual head gamma camera. For SPECT ventilation, Tc-99m DTPA was aerosolized and inhaled, while for SPECT perfusion, Tc-99m MAA was injected intravenously. The range of inhaled Tc-99m DTPA was 21.2-25.9 mCi (mean±SD: 23.8±1.5 mCi), while the range of injected Tc-99m MAA was 4.1-4.9 mCi (mean±SD: 4.5±0.3 mCi). The SPECT scans were acquired in a 128×128 matrix with a pixel size of 4.6 mm×4.6 mm.

Figure 12:
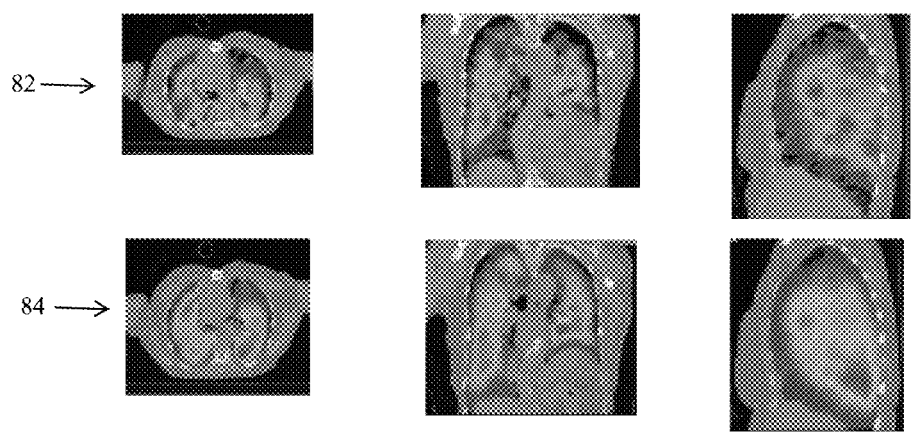
FIG. 12 includes a set of images showing a SPECT ventilation image and a SPECT perfusion image for a patient.

FIG. 12 shows the SPECT ventilation image and SPECT perfusion image for Patient 1. The SPECT images have been thresholded to the 95th percentile value of intensities within the segmented lung area in order to remove the SPECT focal areas of intense tracer activities, occurring because of airway deposition of the tracer. (First row) The SPECT ventilation image ($V_{SPECT}$) and (Second row) SPECT perfusion image ($Q_{SPECT}$) of the first patient at (first column) mid-axial, (second column) mid-coronal, and (third column) mid-sagittal slice which has shown with a scale from 5th percentile value to the 95th percentile value. The xth percentile value is the ventilation or perfusion value at this value x % of the total lung volume has lower value.

The 4-D CT derived images ($V_{jac}, V_{\lambda_1}, V_{\lambda_2}, V_{\lambda_3}$) were separately registered with SPECT ventilation and perfusion maps with an affine transformation using elastix (S. Klein, M. Staring, K. Murphy et al., "elastix: A toolbox for intensity-based medical image registration," IEEE Transactions on Medical Imaging, 29(1), 196-205 (2010)). Thereafter, the physiologic accuracy of registered 4-D CT ventilation maps (i.e., Jacobian and principal strains) was quantified by comparison with both SPECT ventilation images ($V_{SPECT}$) and SPECT perfusion images ($Q_{SPECT}$) as ground truth for measuring the pulmonary function. The Spearman's rank correlation coefficient ($\rho$) was determined in order to quantify the correlation between each of the 4-D CT derived ventilation images and the SPECT images. Spearman's rank correlation coefficient is a non-parametric measure of statistical dependence between two images. The Pearson's linear correlation coefficient (PCC) was also calculated as a measure of the strength of linear dependence between each of the 4-D CT derived ventilation images and the SPECT images.

Table 3 shows the Spearman's correlation coefficient ($\rho$) and Pearson's linear correlation coefficient (PCC) between each of the 4-D CT derived ventilation images ($V_{jac}$, $V_{\lambda_1}$, $V_{\lambda_2}$, $V_{\lambda_3}$) and $V_{SPECT}$ for all seven subjects in this study.

with $V_{SPECT}$ and $Q_{SPECT}$. Without wishing to be bound by any particular theory, this was attributed to MOFID's accurate estimation of the deformation field between respiratory phases of 4-D CT images. However in comparison to $V_{\lambda_1}$, $V_{jac}$ shows less correlation with both $V_{SPECT}$ and $Q_{SPECT}$. $V_{\lambda_1}$ consistently has a better agreement and more significant correlation with $V_{SPECT}$ and $Q_{SPECT}$ when compared to $V_{jac}$ ($p<10^{-3}$). This may be due to the relation between Jacobian and principal strain values:

$$J = (2\lambda_1 + 1)(2\lambda_2 + 1)(2\lambda_3 + 1) \quad (12)$$

All three principal strain values, ($V_{\lambda_1}$, $V_{\lambda_2}$, $V_{\lambda_3}$), affect the value of the Jacobian in a non-linear fashion. Since $V_{\lambda_1}$ is the maximum principal strain value, it has a more significant impact on the statistical correlation of the Jacobian with both $V_{SPECT}$ and $Q_{SPECT}$; however, $V_{\lambda_2}$ and $V_{\lambda_3}$ being less correlated to $V_{SPECT}$ and $Q_{SPECT}$ weaken the correlation of Jacobian with both $V_{SPECT}$ and $Q_{SPECT}$.

Overall, however, the 4-D CT derived ventilation images show a relatively weak correlation with both SPECT ventilation ($V_{SPECT}$) and SPECT perfusion ($Q_{SPECT}$), which con-

TABLE 3

| Pt | | $V_{Jac}$ | p-value | $V_{\lambda_1}$ | p-value | $V_{\lambda_2}$ | p-value | $V_{\lambda_3}$ | p-value |
|---|---|---|---|---|---|---|---|---|---|
| 1 | $\rho$ | −0.1948 | 0 | −0.3186 | 0 | −0.1711 | <0.001 | −0.0302 | <0.001 |
|   | PCC | −0.1222 | <0.001 | −0.2859 | 0 | −0.1311 | <0.001 | 0.0853 | <0.001 |
| 2 | $\rho$ | 0.1224 | <0.001 | −0.1408 | <0.001 | −0.0264 | <0.001 | 0.0878 | 0 |
|   | PCC | 0.1342 | <0.001 | −0.1333 | <0.001 | 0.0066 | 0.14 | 0.0027 | 0.54 |
| 3 | $\rho$ | −0.1772 | <0.001 | −0.3203 | 0 | −0.1909 | <0.001 | −0.0287 | <0.001 |
|   | PCC | −0.0978 | <0.001 | −0.1919 | <0.001 | −0.0703 | <0.001 | 0.0039 | 0.44 |
| 4 | $\rho$ | 0.022 | <0.001 | −0.1672 | <0.001 | −0.0637 | <0.001 | 0.1308 | <0.001 |
|   | PCC | 0.0357 | <0.001 | −0.1373 | <0.001 | −0.0205 | <0.001 | 0.1436 | <0.001 |
| 5 | $\rho$ | −0.1978 | <0.001 | −0.3213 | 0 | −0.1616 | <0.001 | 0.0426 | <0.001 |
|   | PCC | −0.1332 | <0.001 | −0.2519 | 0 | 0.1162 | <0.001 | −0.0062 | <0.001 |
| 6 | $\rho$ | −0.0992 | <0.001 | −0.3761 | 0 | −0.0791 | <0.001 | −0.0007 | 0.86 |
|   | PCC | −0.0272 | <0.001 | −0.3449 | 0 | 0.001 | 0.8 | 0.1424 | <0.001 |
| 7 | $\rho$ | 0.0653 | <0.001 | −0.1643 | 0 | 0.1115 | <0.001 | 0.1183 | <0.001 |
|   | PCC | 0.0848 | <0.001 | −0.1315 | <0.001 | 0.0632 | <0.001 | 0.1499 | 0 |

Similarly, Table 4 shows the Spearman's correlation coefficient ($\rho$) and Pearson's linear correlation coefficient (PCC) between each of the 4-D CT derived ventilation images and $Q_{SPECT}$ for all subjects.

form to previous studies, identified above. This could be due to issues present in both 4-D CT and SPECT imaging. Lung cancer patients can have irregular breathing; this leads to artifacts and degradation in the acquired 4-D CT images.

TABLE 4

| Pt | | $V_{Jac}$ | p-value | $V_{\lambda_1}$ | p-value | $V_{\lambda_2}$ | p-value | $V_{\lambda_3}$ | p-value |
|---|---|---|---|---|---|---|---|---|---|
| 1 | $\rho$ | −0.179 | 0 | −0.319 | 0 | −0.1774 | 0 | −0.0113 | 0.01 |
|   | PCC | −0.1349 | <0.001 | −0.305 | 0 | −0.1516 | <0.001 | 0.086 | <0.001 |
| 2 | $\rho$ | 0.0147 | 0.001 | −0.2303 | 0 | −0.0658 | <0.001 | 0.2111 | 0 |
|   | PCC | 0.0625 | <0.001 | −0.1891 | 0 | −0.0257 | <0.001 | 0.0007 | 0.87 |
| 3 | $\rho$ | −0.0564 | <0.001 | −0.174 | <0.001 | −0.1148 | <0.001 | 0.0481 | <0.001 |
|   | PCC | −0.0488 | <0.001 | −0.1529 | <0.001 | −0.0678 | <0.001 | −0.0014 | 0.79 |
| 4 | $\rho$ | −0.1003 | <0.001 | −0.3238 | 0 | −0.1826 | <0.001 | 0.0839 | <0.001 |
|   | PCC | −0.0898 | <0.001 | −0.2927 | 0 | −0.132 | <0.001 | 0.1102 | <0.001 |
| 5 | $\rho$ | −0.1513 | <0.001 | −0.2308 | 0 | −0.1258 | <0.001 | 0.0406 | <0.001 |
|   | PCC | −0.0876 | <0.001 | −0.1772 | <0.001 | −0.078 | <0.001 | −0.0057 | 0.3 |
| 6 | $\rho$ | −0.2638 | 0 | −0.3344 | 0 | −0.1838 | 0 | −0.1868 | 0 |
|   | PCC | −0.2076 | 0 | −0.3275 | 0 | −0.1179 | <0.001 | −0.0418 | <0.001 |
| 7 | $\rho$ | −0.0739 | <0.001 | −0.1736 | 0 | 0.0214 | <0.001 | −0.0343 | <0.001 |
|   | PCC | −0.0491 | <0.001 | −0.1143 | <0.001 | −0.0116 | 0.002 | 0.0147 | <0.001 |

In comparison to previously reported studies (R. Castillo, E. Castillo, J. Martinez et al., "Ventilation from four-dimensional computed tomography: density versus Jacobian methods," Physics in Medicine and Biology, 55(16), 4661-4685 (2010); T. Yamamoto, S. Kabus, T. Klinder et al., "Four-dimensional computed tomography pulmonary ventilation images vary with deformable image registration algorithms and metrics," Medical Physics, 38(3), 1348-1358 (2011)), the measure of Jacobian ($V_{jac}$) resulted in a better correlation Artifacts in treatment planning 4-D CT images cause inaccuracies in calculated CT ventilation images. Likewise, Tc-99m DTPA aerosols cause artifacts in SPECT images due to the central airway deposition rendering SPECT scans prone to inaccuracies. The difference of imaged lung volumes between 4-D CT and SPECT should also be highlighted. SPECT ventilation and perfusion scans are free breathing scans, thus they are blurred average images of the ventilation and perfusion volumes of the patient that is studied. However, the 4-D CT scan is gated to RPM, and patients are coached via an audiovisual feedback to time their breathing so that their lung volume goes from the max-inhale phase to the max-exhale phase. It is therefore expected that the ventilation metrics between the max-inhale and max-exhale phases do not entirely match the ventilation and/or perfusion metrics as derived from SPECT images. Therefore, the apparent mismatch between 4-D CT derived ventilation maps and SPECT does not refute the hypothesis that quantitative images depicting regional ventilation from 4-D CT can indeed provide an accurate appraisal of pulmonary function for use in image-guided radiation therapy of the lung.

The 4-D CT derived quantitative images of regional lung function and their physiologic accuracy were evaluated on seven non-small cell lung cancer patients and were compared with SPECT ventilation and perfusion scans in the same patients. Specifically, strain was introduced as a novel index of regional pulmonary function from 4-D CT. It was also determined that the maximum principal strain pulmonary function map derived from MOFID outperforms the Jacobian, as well as other principal strain function maps. Finally, in comparison to previous studies, the Jacobian function map derived from MOFID produced a better correlation with both SPECT ventilation and perfusion maps.

The reported correlation between strain derived from 4-D CT with SPECT ventilation and perfusion is significant and validates strain as a measure of regional lung function. Furthermore, the 4-D CT strain measurements will make it possible to evaluate the functional lung volume in patients.

Throughout this document, various references are cited. All such references are incorporated herein by reference, including the references set forth in the following list:

REFERENCES

1. B. Suki, and J. H. T. Bates, "Lung tissue mechanics as an emergent phenomenon," *Journal of Applied Physiology*, vol. 110, no. 4, pp. 1111-1118, 2011.
2. J. H. T. Bates, G. S. Davis, A. Majumdar et al., "Linking parenchymal disease progression to changes in lung mechanical function by percolation," *Am. J. Respir. Crit. Care Med.*, vol. 176, no. 6, pp. 617-623, Sep. 15, 2007, 2007.
3. J. Yernault, M. d. Jonghe, A. d. Coster et al., "Pulmonary mechanics in diffuse fibrosing alveolitis," *Bull Physiopathol Respir*, vol. 11, no. 2, pp. 231-244, 1975.
4. D. Massaro, L. Clerch, D. Temple et al., "Surfactant deficiency in rats without a decreased amount of extracellular surfactant," *J Clin Invest*, vol. 71, no. 6, pp. 1536-1543, 1983.
5. I. Greaves, and H. Colebatch, "Elastic behavior and structure of normal and emphysematous lungs post mortem," *Am Rev Respir Dis*, vol. 121, no. 1, pp. 127-136, 1980.
6. D. Sarrut, V. Boldae, S. Miguet et al., "Simulation of 4-D CT images from deformable registration between inhale and exhale breath-hold CT scans," *Medical Physics*, vol. 33, no. 3, pp. 605-617, 2006.
7. E. Castillo, R. Castillo, Y. Zhang et al., "Compressible image registration for thoracic computed tomography images," *Journal of Medical and Biological Engineering*, vol. 29, no. 5, pp. 236-247, 2009.
8. Y. Yin, E. A. Hoffman, and C.-L. Lin, "Mass preserving non-rigid registration of CT lung images using cubic B-spline," *Medical Physics*, vol. 36, no. 9, pp. 4213-4222, 2009.
9. K. Murphy, B. van Ginneken, J. Reinhardt et al., "Evaluation of registration methods on thoracic CT: The EMPIRE10 challenge," *IEEE Transactions on Medical Imaging*, vol. 30, no. 11, pp. 1901-1920, 2011.
10. N. J. Tustison, T. S. Cook, G. Song et al., "Pulmonary kinematics from image data: A review," *Academic Radiology*, vol. 18, no. 4, pp. 402-417, 2011.
11. G. S. Mageras, "Respiration correlated CT techniques for gated treatment of lung cancer," *Radiother. Oncol.*, vol. 64, no. 75, 2002.
12. D. A. Low, M. Nystrom, E. Kalinin et al., "A method for the reconstruction of four-dimensional synchronized CT scans acquired during free breathing" *Medical Physics*, vol. 30, no. 6, pp. 1254-1263, 2003.
13. E. Rietzel, G. T. Chen, K. P. Doppke et al., "4D computed tomography for treatment planning," *Int J Radiat Oncol Biol Phys*, vol. 57, pp. S232-S233, 2003.
14. T. Pan, T. Y. Lee, E. Rietzel et al., "4D-CT imaging of a volume influenced by respiratory motion on multi-slice CT," *Medical Physics*, vol. 31, pp. 333-340, 2004.
15. P. J. Keall, G. Starkschall, H. Shukla et al., "Acquiring 4D thoracic CT scans using a multislice helical method," *Physics in Medicine and Biology*, vol. 49, pp. 2053-2067, 2004.
16. M. Endo, T. Tsunoo, S. Kandatsu et al., "Four-dimensional computed tomography (4D CT)—concepts and preliminary development," *Radiation Medicine*, vol. 21, no. 1, pp. 17-22, 2003.
17. S. S. Vedam, P. J. Keall, V. R. Kini et al., "Acquiring a four-dimensional computed tomography dataset using an external respiratory signal," *Physics in medicine and biology*, vol. 48, no. 1, pp. 45-62, 2003.
18. P. Keall, "Four-dimensional computed tomography imaging and treatment planning," *Seminars in Radiation Oncology*, vol. 14, no. 1, pp. 81-90, 2004.
19. E. Rietzel, T. Pan, and G. Chen, "Four-dimensional computed tomography: Image formation and clinical protocol," *Medical Physics*, vol. 32, no. 4, pp. 974-989, 2005.
20. T. Guerrero, G. Zhang, T. Huang et al., "Intrathoracic tumour motion estimation from CT imaging using the 3D optical flow method," *Physics in Medicine and Biology*, vol. 49, pp. 4147-4161, 2004.
21. J. M. Reinhardt, G. E. Christensen, E. A. Hoffman et al., *Registration-derived estimates of local lung expansion as surrogates for regional ventilation*, p. pp. 763-774, Kerkrade, The Netherlands: Springer Berlin/Heidelberg, 2007.
22. E. Castillo, R. Castillo, J. Martinez et al., "Four-dimensional deformable image registration using trajectory modeling," *Physics in Medicine and Biology*, vol. 55, no. 1, pp. 305-327, 2010.
23. C. T. Metz, S. Klein, M. Schaap et al., "Nonrigid registration of dynamic medical imaging data using nD+t B-splines and a groupwise optimization approach," *Medical Image Analysis*, vol. 15, no. 2, pp. 238-249, 2011.
24. I. Sluimer, A. Schilham, M. Prokop et al., "Computer analysis of computed tomography scans of the lung: a survey," *IEEE Transactions on Medical Imaging*, vol. 25, no. 4, pp. 385-405, 2006.
25. L. Ding, G. Getz, D. A. Wheeler et al., "Somatic mutations affect key pathways in lung adenocarcinoma," *Nature*, vol. 455, no. 7216, pp. 1069-75, 2008.
26. G. E. Christensen, J. H. Song, W. Lu et al., "Tracking lung tissue motion and expansion/compression with inverse consistent image registration and spirometry," *medical Physics*, vol. 34, no. 6, pp. 2155-2163, 2007.
27. S. Kabus, T. Klinder, K. Murphy et al., "Evaluation of 4D-CT lung registration," in Medical Imaging Computing and Computer Assisted Intervention (MICCAI), 2009, pp. 747-754.
28. H. R. Sanders, and M. Albitar, "Somatic mutations of signaling genes in non-small-cell lung cancer," *Cancer Genet Cytogenet*, vol. 203, no. 1, pp. 7-15, 2010.
29. M. Negandar, A. Zacarias, N. Dunlap et al., "An automated landmark-based elastic registration technique for large deformation recovery from 4-D CT lung images," in 30. V. Gorbunova, P. Lo, H. Ashraf et al., "Weight preserving image registration for monitoring disease progression in lung CT medical image computing and computer-assisted intervention," in Medical Imaging Computing and Computer Assisted Intervention (MICCAI), 2008, pp. 863-870.
31. V. Boldea, G. C. Sharp, S. B. Jiang et al., "4D-CT lung motion estimation with deformable registration: Quantification of motion nonlinearity and hysteresis," *Medical Physics*, vol. 35, no. 3, pp. 1008-1018, 2008.
32. V. Gorbunova, S. Durrleman, P. Lo et al., "Curve- and Surface-based registration of lung CT images via currents," in Second International Workshop on Pulmonary Image Analysis. 2009, pp. 15-25.
33. C. Plathow, M. Schoebinger, F. Herth et al., "Estimation of pulmonary motion in healthy subjects and patients with intrathoracic tumors using 3D-dynamic MRI: initial results," *Korean J Radiol.*, vol. 10, no. 6, pp. 559-567, 2009.
34. M. Urschler, and H. Bischof, "Assessing breathing motion by shape matching of lung and diaphragm surfaces," in SPIE Int. Opt. Eng. 2005, pp. 440-452.
35. K. Ding, Y. Yin, K. Cao et al., "Evaluation of lobar biomechanics during respiration using image registration," in Medical Imaging Computing and Computer Assisted Intervention (MICCAI), *Lecture Notes in Computer Science*. 2009, pp. 739-746.
36. A. Hilsmann, T. Vik, M. Kaus et al., "Deformable 4DCT lung registration with vessel bifurcations," in International Conference of Computer Assisted Radiology and Surgery (CARS), 2007.
37. Z. Wu, E. Rietzel, V. Boldea et al., "Evaluation of deformable registration of patient lung 4DCT with subanatomical region segmentations," *Medical Physics*, vol. 35, no. 2, pp. 775-781, 2008.
38. Y. Yin, E. A. Hoffman, K. Ding et al., "A cubic B-spline-based hybrid registration of lung CT images for a dynamic airway geometric model with large deformation," *Physics in Medicine and Biology*, vol. 56, no. 1, pp. 203-218, 2011.
39. D. Loeckx, D. Smeets, J. Keustermans et al., "3D lung registration using splineMIRIT and robust tree registration (RTR)," in Medical Image Analysis for the Clinic: A Grand Challenge. 2010, pp. 109-117.
40. M. M. Coselmon, J. M. Balter, D. L. M. Shan et al., "Mutual information based CT registration of the lung at exhale and inhale breathing states using thin-plate Splines," *Medical Physics*, vol. 31, no. 11, pp. 2942-2948, November, 2004.
41. B. Li, G. E. Christensen, G. McLennan et al., "Establishing a normative atlas of the human lung: Inter-subject warping and registration of volumetric CT images," *Acad. Radiol.*, vol. 10, no. 3, pp. 255-265, 2003.
42. G. K. Matsopoulos, N. A. Mouravliansky, P. A. Asvestas et al., "Thoracic non-rigid registration combining self-organizing maps and radial basis functions," *Medical Image Analysis*, vol. 9, no. 3, pp. 237-254, 2005.
43. C. Stewart, Y. Lee, and C. Tsai, "An uncertainty-driven hybrid of intensity-based and feature-based registration with application to retinal and lung CT images," in Medical Imaging Computing and Computer Assisted Intervention (MICCAI), 2004, pp. 870-877.
44. J. B. A. Maintz, and M. A. Viergever, "A survey of medical image registration," *Medical Image Analysis*, vol. 2, no. 2, pp. 1-36, 1997.
45. B. Zitova, and J. Flusser, "image registration methods: a survey," *Image and Vision Computing*, vol. 21, pp. 977-1000, 2003.
46. J. Weickert, A. Bruhn, T. Brox et al., "A Survey on variational optic flow methods for small displacements," *Mathematical Models for Registration and Applications to Medical Imaging*, Mathematics in Industry O. Scherzer, ed., pp. 103-136, Berlin: Springer, 2006.
47. L. Fan, C. W. Chen, J. M. Reinhardt et al., "Evaluation and application of 3D lung warping and registration model using HRCT images," in SPIE Conf. Medical Imaging. 2001, pp. 234-243.
48. L. Weruaga, J. Morales, L. Nunez et al., "Estimating volumetric motion in human thorax with parametric matching constraints," *IEEE Transactions on Medical Imaging*, vol. 22, no. 6, pp. 766-772, 2003.
49. M. Kaus, T. Netsch, S. Kabus et al., "Estimation of organ motion from 4D CT for 4D radiation therapy planning of lung cancer," in Medical Imaging Computing and Computer Assisted Intervention (MICCAI), *Lecture Notes in Computer Science*. 2004, pp. 1017-1024.
50. W. Lu, M.-L. Chen, G. H. Olivera et al., "Fast free-form deformable registration via calculus of variations," *Physics in medicine and biology*, vol. 49, no. 14, pp. 3067-3087, 2004.
51. L. Dougherty, D. Torigian, J. Affusso et al., "Use of an optical flow method for the analysis of serial CT lung images," *Acad. Radiol.*, vol. 13, no. 1, pp. 14-23, 2006.
52. T. Guerrero, K. Sanders, E. Castillo et al., "Dynamic ventilation imaging from four-dimensional computed tomography," *Physics in Medicine and Biology*, vol. 51, no. 4, pp. 777-791, 2006.
53. D. A. Torigian, W. B. Gefter, J. D. Affuso et al., "Application of an optical flow method to inspiratory and expiratory lung MDCT to assess regional air trapping: A feasibility study" *American Journal of Roentgenology*, vol. 188, no. 3, pp. 276-280, 2007.
54. . Dawood, F. Buther, J. Xiaoyi et al., "Respiratory motion correction in 3-D PET data with advanced optical flow algorithms," *IEEE Transactions on Medical Imaging*, vol. 27, no. 8, pp. 1164-1175, 2008.
55. J. M. Reinhardt, K. Ding, K. Cao et al., "Registration-based estimates of local lung tissue expansion compared to xenon-CT measures of specific ventilation," *Medical Image Analysis*, vol. 12, no. 6, pp. 752-763, 2008.
56. D. Yang, W. Lu, D. A. Low et al., "4D-CT motion estimation using deformable image registration and 5D respiratory motion modeling," *Medical Physics*, vol. 35, no. 10, pp. 4577-4590, 2008.
57. S. Kabus, and C. Lorenz "Fast elastic image registration," in Medical Image Analysis for the Clinic: A Grand Challenge. 2010, pp. 81-89.
58. R. Castillo, E. Castillo, J. Martinez et al., "Ventilation from four-dimensional computed tomography: density versus Jacobian methods," *Physics in Medicine and Biology*, vol. 55, no. 16, pp. 4661-4685, 2010.
59. G. Song, N. Tustison, B. Avants et al., "Lung CT image registration using diffeomorphic transformation models," in Medical Image Analysis for the Clinic: A Grand Challenge. 2010, pp. 23-32.
60. M. Staring, S. Klein, and J. P. W. Pluim, "A rigidity penalty term for nonrigid registration," *Medical Physics*, vol. 34, pp. 4098-4108, 2007.
61. M. Staring, S. Klein, J. H. C. Reiber et al., "Pulmonary image registration with elastix using a standard intensity-based algorithm," in Medical Image Analysis for the Clinic: A Grand Challenge. 2010, pp. 73-79.
62. J. Vandemeulebroucke, S. Rit, J. Schaerer et al., "Deformable image registration with automated motion-mask extraction," in Medical Image Analysis for the Clinic: A Grand Challenge. 2010, pp. 119-125.
63. M. Modat, J. McClelland, and S. Ourselin, "Lung registration using the NiftyReg package," in Medical Image Analysis for the Clinic: A Grand Challenge. 2010, pp. 33-42.

64. Y. Yin, E. A. Hoffman, and C.-L. Lin, "Local tissue-weight-based nonrigid registration of lung images with application to regional ventilation," in SPIE Conf. Medical Imaging. 2009, pp. 72620C.
65. R. P. Wildes, M. J. Amabile, A.-M. Lanzillotto et al., "Recovering estimates of fluid flow from image sequence data," *Computer Vision and Image Understanding*, vol. 80, no. 2, pp. 246-266, 2000.
66. V. Gorbunova, J. Sporring, P. Lo et al., "Mass preserving image registration: Results of evaluation of methods for pulmonary image registration 2010 challenge," in Medical Image Analysis for the Clinic: A Grand Challenge. 2010, pp. 155-164.
67. M. Negandar, and A. A. Amini, "Estimation of affine motion from projection data using a mass conservation model," in 33rd Annual International Conference of the IEEE Engineering in Medicine and Biology Society, 2011. EMBS '11. 2011, pp. 8041-8044.
68. M. Negandar, and A. A. Amini, "Planar deformable motion estimation incorporating mass conservation and image gradient constancy," in IEEE International Symposium on Biomedical Imaging (ISBI): From Nano to Macro. 2011, pp. 536-540.
69. M. Negandar, and A. A. Amini, "A 3-D optical flow technique based on mass conservation for deformable motion estimation from 4-D CT images of the lung," in SPIE Conf. on Biomedical Applications in Molecular, Structural and Functional Imaging. 2012.
70. G. E. Christensen, and H. J. Johnson, "Consistent image registration," *IEEE Transactions on Medical Imaging*, vol. 20, no. 7, pp. 568-582, 2001.
71. B. Li, G. Christensen, E. Hoffman et al., "Pulmonary CT image registration and warping for tracking tissue deformation during the respiratory cycle through 3D consistent image registration," *Medical Physics*, vol. 35, no. 12, pp. 5575-5583, 2008.
72. A. Schmidt-Richberg, J. Ehrhardt, R. Werner et al., "Diffeomorphic diffusion registration of lung CT images," in Medical Image Analysis for the Clinic: A Grand Challenge. 2010, pp. 55-62.
73. J. Ehrhardt, R. Werner, A. Schmidt-Richberg et al., "Statistical Modeling of 4D Respiratory Lung Motion Using Diffeomorphic Image Registration," *IEEE Transactions on Medical Imaging*, vol. 30, no. 2, pp. 251-265, 2011.
74. J. L. Barron, D. J. Fleet, and S. S. Beauchemin, "Performance of optical flow techniques," *International Journal of Computer Vision* (IJCV), vol. 12, no. 1, pp. 43-77, February, 1994.
75. H. Liu, T.-H. Hong, M. Herman et al., "Accuracy vs efficiency trade-offs in optical flow algorithms," *Computer Vision and Image Understanding*, vol. 72, no. 3, pp. 271-286, 1998.
76. B. McCane, K. Novins, D. Crannitch et al., "On benchmarking optical flow," *Computer Vision and Image Understanding*, vol. 84, no. 1, pp. 126-143, 2001.
77. M. Negandar, and A. A. Amini, "Tracking planar lung motion in 4D CT with optical flow: validations and comparison of global, local, and local-global methods," in SPIE Conf. on Biomedical Applications in Molecular, Structural and Functional Imaging. 2010.
78. S. Baker, D. Scharstein, J. P. Lewis et al., "A database and evaluation methodology for optical flow," *International Journal of Computer Vision*, vol. 92, no. 1, pp. 1-31, 2011.
79. A. Amini, "A scalar function formulation for optical flow," in Computer Vision—ECCV '94, Lecture Notes in Computer Science. 1994, pp. 123-131.
80. B. K. P. Horn, and B. G. Schunck, "Determining optical flow," *Artificial Intelligence*, vol. 17, pp. 185-203, 1981.
81. B. D. Lucas, and T. Kanade, "An iterative image registration technique with an application to stereo vision," in Proceedings of DARPA Image Understanding workshop, 1981, pp. 121-130.
82. A. Bruhn, J. Weickert, and C. Schnorr, "Lucas/Kanade meets Horn/Schunck: combining local and global optic flow methods," *International Journal of Computer Vision*, vol. 61, no. 3, pp. 211-231, 2005.
83. E. Rietzel, and G. Chen, "Deformable registration of 4D computed tomography data," *Medical Physics*, vol. 33, no. 11, pp. 4423-4430, 2006.
84. H.-H. Nagel, and W. Enkelmann, "An investigation of smoothness constraints for the estimation of displacement vector fields from image sequences," *IEEE Transactions on Pattern Analysis and Machine Intelligence*, vol. 8, no. 5, pp. 565-593, 1986.
85. L. Alvarez, J. Weickert, and J. S'anchez, "Reliable estimation of dense optical flow fields with large displacements," *International Journal of Computer Vision*, vol. 39, no. 1, pp. 41-56, 2000.
86. T. Brox, A. Bruhn, N. Papenberg et al., "High accuracy optical flow estimation based on a theory of warping," in ECCV. 2004, pp. 25-36.
87. J. Weickert, and C. Schnorr, "Variational optic flow computation with a spatio-temporal smoothness constraint," *J. Math. Imaging and Vision*, vol. 14, no. 3, pp. 245-255, 2001.
88. W. H. Press, B. P. Flannery, S. A. Teukolsky et al., *Numerical Recipes in C: The Art of Scientific Computing*: Cambridge University Press, 1988.
89. C. Studholme, D. L. G. Hill, and D. J. Hawkes, "An overlap invariant entropy measure of 3D medical image alignment," *Pattern Recognition*, vol. 32, no. 1, pp. 71-86, 1999.
90. C. Hua-Mei, P. K. Varshney, and M. K. Arora, "Performance of mutual information similarity measure for registration of multitemporal remote sensing images," *IEEE Transactions on Geoscience and Remote Sensing*, vol. 41, no. 11, pp. 2445-2454, 2003.
91. L. Papp, M. Zuhayra, E. Henze et al., "Extended normalized mutual information for lung SPECT-CT registration," in Bioinformatics and Biomedical Engineering, 2009. ICBBE 2009. 3rd International Conference on, 2009, pp. 1-3.
92. J. Vandemeulebroucke, D. Sarrut, and P. Clarysse, "The POPI-model, a point-validated pixel-based breathing thorax model," in International Conference on the Use of Computers in Radiation Therapy (ICCR), Toronto, Canada, 2007.
93. R. Castillo, E. Castillo, R. Guerra et al., "A framework for evaluation of deformable image registration spatial accuracy using large landmark point sets," *Physics in medicine and biology*, vol. 54, no. 7, pp. 1849-1870, 2009.
94. D. Sarrut, V. Boldea, M. Ayadi et al., "Non-rigid registration method to assess reproducibility of breath-holding with ABC in lung cancer," *Int J Radiat Oncol Biol Phys*, vol. 61, no. 2, pp. 594-607, 2005.

It will be understood that various details of the presently disclosed subject matter can be changed without departing from the scope of the subject matter disclosed herein.

Furthermore, the foregoing description is for the purpose of illustration only, and not for the purpose of limitation.

What is claimed is:

1. A method of deformable image registration for thoracic 4-D computed tomography (CT) images, comprising:
   receiving, by a processing device, a set of thoracic 4-D CT images; and
   iteratively solving, by the processing device, an energy function applied to subsequent images of the set of thoracic 4-D CT images to transform the subsequent images into respective optical flow fields between the subsequent images, the energy function enforcing the following constraints on the subsequent images:
intensity constancy;
mass conservation;
gradient constancy; and
spatio-temporal smoothness.

2. The method of claim 1,
wherein intensity constancy is formulated as:

$$I(X+W)=I(X)$$

where I is the image intensity as a function of space and time, $X:=(x, y, z, t)^T$, and $W:=(u, v, w, 1)^T$ is a displacement vector field between the subsequent images;
wherein mass conservation is formulated as:

$$\nabla \cdot (IV)+I_t=0 \Rightarrow \nabla I \cdot (V)+I(\nabla \cdot V)+I_t=0$$

$$I_x u+I_y v+I_z w+Iu_x+Iv_y+Iw_z+I_t=0$$

where $V=(u, v, w)$ is a velocity field;
wherein gradient constancy is formulated as:

$$\nabla I(X+W)=\nabla I(X)$$

wherein spatio-temporal smoothness is formulated as:

$$|\nabla_4 u|^2+|\nabla_4 v|^2+|\nabla_4 w|^2$$

where $\nabla_4:=(\partial_x, \partial_y, \partial_z, \partial_t)^T$ and u, v, and w are components of displacement along x, y, and z; and
wherein the energy function is formulated as:

$$E(u, v, w) = \int_{\Omega_t}\int_{\Omega_s} (E_D + \alpha E_S) dv\, dt$$

$$= \int_{\Omega_t}\int_{\Omega_s} \psi[|I(X + W) - I(X) + \beta(I\nabla \cdot V)|^2 +$$

$$\gamma|\nabla I(X + W) - \nabla I(X)|^2] + \alpha(\psi[|\nabla_4 u|^2 + |\nabla_4 v|^2 + |\nabla_4 w|^2])dv\,dt$$

where:
$\Omega_s$ is a volume over which motion is to be estimated;
$\Omega_t$ is a temporal sequence of volumetric lung images;
the function $\psi(s^2)=\sqrt{s^2+\epsilon^2}$ is a modified $L_1$ norm which is convex and yields robustness to outliers in the minimization process;
$\epsilon$ is a non-zero number utilized for numerical reasons to avoid dividing by zero; and
$\beta$ can only be zero or one: zero when the object is incompressible and one when the object is compressible.

3. The method of claim 2, wherein the energy function is discretized with all image derivatives approximated by finite differences.

4. The method of claim 3, further comprising:
downsampling the set of thoracic 4-D CT images into a set of downsampled thoracic 4-D CT images prior to computing the optical flow field;
computing the respective optical flow fields between the subsequent images of the set of downsampled thoracic 4-D CT images as respective downsampled optical flow fields;
upsampling the set of downsampled thoracic 4-D CT images into an upsampled set of thoracic 4-D CT images; and
computing the respective optical flow fields between the subsequent images of the set of upsampled thoracic 4-D CT images using the respective downsampled optical flow fields as respective initial transformations.

5. A method of determining regional lung function comprising:
receiving, by a processing device, a set of thoracic 4-D CT images of a lung;
transforming, by the processing device, the set of 4-D CT images of the lung into respective spatial voxel-wise deformation maps; and
transforming, by the processing device, the spatial voxel-wise deformation maps into respective spatial voxel-wise strain maps of the lung indicating regional mechanics of the lung.

6. The method of claim 5, wherein transforming the set of 4-D CT images into the respective spatial voxel-wise deformation maps comprises registering volumetric images of expiratory phases of the lung pairwise to calculate a deformation field between a max-inhale respiratory phase and a max-exhale respiratory phase of the 4-D CT images through composition of pairwise calculated deformations (u, v, w).

7. The method of claim 6, wherein transforming the set of 4-D CT images into the respective spatial voxel-wise deformation maps further comprises calculating a deformation gradient tensor (DGT) as:

$$F = \begin{bmatrix} 1+u_x & u_y & u_z \\ v_x & 1+v_y & v_z \\ w_x & w_y & 1+w_z \end{bmatrix}.$$

8. The method of claim 7, further comprising calculating the determinant of the DGT (the Jacobian) as:

$$J=det(F)$$

and determining the degree of regional lung expansion/compression at each inhale voxel position using the Jacobian.

9. The method of claim 8, further comprising calculating the Lagrangian strain tensor, E, as:

$$E = \frac{1}{2}(F^T F - I)$$

where I is the identity matrix, and performing an eigenvalue decomposition on the Lagrangian strain tensor to yield three principal strain values $(\lambda_1, \lambda_2, \lambda_3)$ corresponding to directions of the principal axes of the reciprocal strain ellipsoid, where the maximum eigenvalue $(\lambda_1)$, the medium eigenvalue $(\lambda_2)$, and the minimum eigenvalue $(\lambda_3)$ are a maximum principal strain, a medium principal strain, and a minimum principal strain, respectively.

10. A method of determining regional lung function comprising:
receiving, by a processing device, a set of thoracic 4-D CT images of a lung;
iteratively solving, by the processing device, an energy function applied to subsequent images of the set of thoracic 4-D CT images to transform the subsequent images into respective spatial voxel-wise deformation maps between the subsequent images, the energy function enforcing the following constraints on the subsequent images:
intensity constancy;
mass conservation;
gradient constancy; and
spatio-temporal smoothness; and
transforming, by the processing device, the spatial voxel-wise deformation maps into respective spatial voxel-wise strain maps of the lung indicating regional mechanics of the lung.

11. The method of claim 10,
wherein intensity constancy is formulated as:

$$I(X+W)=I(X)$$

where I is the image intensity as a function of space and time, $X:=(x, y, z, t)^T$, and $W:=(u, v, w, 1)^T$ is a displacement vector field between the subsequent images;
wherein mass conservation is formulated as:

$$\nabla \cdot (IV)+I_t=0 \Rightarrow \nabla I \cdot (V)+I(\nabla \cdot V)+I_t=0$$

$$I_x u+I_y v+I_z w+Iu_x+Iv_y+Iw_z+I_t=0$$

where $V=(u, v, w)$ is a velocity field;
wherein gradient constancy is formulated as:

$$\nabla I(X+W)=\nabla I(X)$$

wherein spatio-temporal smoothness is formulated as:

$$|\nabla_4 u|^2+|\nabla_4 v|^2+|\nabla_4 w|^2$$

where $\nabla_4:=(\partial_x, \partial_y, \partial_z, \partial_t)^T$ and u, v, and w are components of displacement along x, y, and z; and
wherein the energy function is formulated as:

$$E(u, v, w) = \int_{\Omega_t}\int_{\Omega_s} (E_D + \alpha E_S) dv dt$$

$$= \int_{\Omega_t}\int_{\Omega_s} \psi[|I(X+W) - I(X) + \beta(I\nabla \cdot V)|^2 +$$

$$\gamma|\nabla I(X+W) - \nabla I(X)|^2] + \alpha(\psi[|\nabla_4 u|^2 + |\nabla_4 v|^2 + |\nabla_4 w|^2]) dv dt$$

where:
$\Omega_s$ is a volume over which motion is to be estimated;
$\Omega_t$ is a temporal sequence of volumetric lung images;
the function $\psi(s^2)=\sqrt{s^2+\epsilon^2}$ is a modified $L_1$ norm which is convex and yields robustness to outliers in the minimization process;
$\epsilon$ is a non-zero number utilized for numerical reasons to avoid dividing by zero; and
$\beta$ can only be zero or one: zero when the object is incompressible and one when the object is compressible.

12. The method of claim 11, wherein transforming the set of 4-D CT images into the respective spatial voxel-wise deformation maps further comprises calculating a deformation gradient tensor (DGT) as:

$$F = \begin{bmatrix} 1+u_x & u_y & u_z \\ v_x & 1+v_y & v_z \\ w_x & w_y & 1+w_z \end{bmatrix}.$$

13. The method of claim 12, further comprising calculating the determinant of the DGT (the Jacobian) as:

$$J=det(F)$$

and determining the degree of regional lung expansion/compression at each inhale voxel position using the Jacobian.

14. The method of claim 13, further comprising calculating the Lagrangian strain tensor, E, as:

$$E = \frac{1}{2}(F^T F - I)$$

where I is the identity matrix, and performing an eigenvalue decomposition on the Lagrangian strain tensor to yield three principal strain values ($\lambda_1, \lambda_2, \lambda_3$) corresponding to directions of the principal axes of the reciprocal strain ellipsoid, where the maximum eigenvalue ($\lambda_1$), the medium eigenvalue ($\lambda_2$), and the minimum eigenvalue ($\lambda_3$) are a maximum principal strain, a medium principal strain, and a minimum principal strain, respectively.

* * * * *

UNITED STATES PATENT AND TRADEMARK OFFICE
CERTIFICATE OF CORRECTION

PATENT NO. : 9,076,201 B1  
APPLICATION NO. : 13/854729  
DATED : July 7, 2015  
INVENTOR(S) : Mohammadreza Negahdar et al.

Page 1 of 1

It is certified that error appears in the above-identified patent and that said Letters Patent is hereby corrected as shown below:

Title Page, (72) Inventors, delete "Mohammadrreza" and replace with "Mohammadreza"

In the Claims, Claim 11, col. 27, line 17, delete

" $|\nabla_4 u|^2 + |\nabla_4 v|^2 + |V_4 w|^2$ "

and replace with

" $|\nabla_4 u|^2 + |\nabla_4 v|^2 + |\nabla_4 w|^2$ "

Signed and Sealed this  
Seventeenth Day of November, 2015

Michelle K. Lee  
*Director of the United States Patent and Trademark Office*